US008990073B2

(12) United States Patent
Malenovsky et al.

(10) Patent No.: US 8,990,073 B2
(45) Date of Patent: Mar. 24, 2015

(54) METHOD AND DEVICE FOR SOUND ACTIVITY DETECTION AND SOUND SIGNAL CLASSIFICATION

(75) Inventors: Vladimir Malenovsky, Sherbrooke (CA); Milan Jelinek, Sherbrooke (CA); Tommy Vaillancourt, Sherbrooke (CA); Redwan Salami, Ville St-Laurent (CA)

(73) Assignee: Voiceage Corporation, Quebec (CA)

( * ) Notice: Subject to any disclaimer, the term of this patent is extended or adjusted under 35 U.S.C. 154(b) by 1063 days.

(21) Appl. No.: 12/664,934

(22) PCT Filed: Jun. 20, 2008

(86) PCT No.: PCT/CA2008/001184
§ 371 (c)(1), (2), (4) Date: Jun. 11, 2010

(87) PCT Pub. No.: WO2009/000073
PCT Pub. Date: Dec. 31, 2008

(65) Prior Publication Data

US 2011/0035213 A1 Feb. 10, 2011

Related U.S. Application Data

(60) Provisional application No. 60/929,336, filed on Jun. 22, 2007.

(51) Int. Cl.
*G10L 21/00* (2013.01)
*G10L 25/78* (2013.01)

(Continued)

(52) U.S. Cl.
CPC *G10L 25/78* (2013.01); *G10L 19/22* (2013.01)
USPC ........... 704/208; 704/203; 704/200; 704/219; 704/500; 704/226; 381/94.3

(58) Field of Classification Search
USPC ......... 704/208, 219, 226, 229, 223, 207, 220, 704/500, 233, 239, 200, 203; 381/94.3
See application file for complete search history.

(56) References Cited

U.S. PATENT DOCUMENTS

| | | | |
|---|---|---|---|
| 5,040,217 | A | 8/1991 | Brandenburg et al. |
| 5,406,635 | A | 4/1995 | Jarvinen |

(Continued)

FOREIGN PATENT DOCUMENTS

| | | |
|---|---|---|
| DE | 101034471 | 2/2003 |
| EP | 0 424 016 | 4/1991 |

(Continued)

OTHER PUBLICATIONS

3GPP TS 26.404 version 2.0.0 "Enhanced aacPlus General Audio Codec; Encoder specification; Spectral Band Replication (SBR) part" (Release 6).*

3GPP TS 26.190 V6.1.1, 3rd Generation Partnership Project, "Technical Specification Group Services and System Aspects; Speech Codec Speech Processing Functions; Adaptive Multi-Rate-Wideband (AMR-WB) Speech Codec; Transcoding Functions, Release 6", Global System for Mobile Communications, Jul. 2005, pp. 1-53.

(Continued)

*Primary Examiner* — Pierre-Louis Desir
*Assistant Examiner* — Neeraj Sharma
(74) *Attorney, Agent, or Firm* — Fay Kaplun & Marcin, LLP

(57) ABSTRACT

A device and method for estimating a tonal stability of a sound signal include: calculating a current residual spectrum of the sound signal; detecting peaks in the current residual spectrum; calculating a correlation map between the current residual spectrum and a previous residual spectrum for each detected peak; and calculating a long-term correlation map based on the calculated correlation map, the long-term correlation map being indicative of a tonal stability in the sound signal.

41 Claims, 6 Drawing Sheets

(51) Int. Cl.

| | |
|---|---|
| *G10L 25/00* | (2013.01) |
| *H04B 15/00* | (2006.01) |
| *G10L 19/22* | (2013.01) |

(56) References Cited

U.S. PATENT DOCUMENTS

| | | | | |
|---|---|---|---|---|
| 5,594,833 | A * | 1/1997 | Miyazawa | 704/221 |
| 5,712,953 | A | 1/1998 | Langs | |
| 5,848,388 | A * | 12/1998 | Power et al. | 704/239 |
| 6,101,464 | A | 8/2000 | Scrizawa | |
| 6,988,064 | B2 * | 1/2006 | Ramabadran et al. | 704/218 |
| 7,124,075 | B2 * | 10/2006 | Terez | 704/203 |
| 7,593,852 | B2 * | 9/2009 | Gao et al. | 704/233 |
| 7,630,881 | B2 * | 12/2009 | Iser et al. | 704/203 |
| 7,653,537 | B2 * | 1/2010 | Padhi et al. | 704/218 |
| 7,873,510 | B2 * | 1/2011 | Kurniawati et al. | 704/200.1 |
| 7,953,605 | B2 * | 5/2011 | Sinha et al. | 704/501 |
| 7,983,904 | B2 * | 7/2011 | Ehara et al. | 704/205 |
| 8,086,449 | B2 * | 12/2011 | Ishii et al. | 704/207 |
| 8,175,869 | B2 * | 5/2012 | Sung et al. | 704/218 |
| 8,214,205 | B2 * | 7/2012 | Jang et al. | 704/226 |
| 8,311,811 | B2 * | 11/2012 | Oh et al. | 704/207 |
| 8,428,957 | B2 * | 4/2013 | Garudadri et al. | 704/500 |
| 2001/0023395 | A1 * | 9/2001 | Su et al. | 704/220 |
| 2004/0133424 | A1 * | 7/2004 | Ealey et al. | 704/233 |
| 2004/0181393 | A1 | 9/2004 | Baumgarte | |
| 2005/0065781 | A1 * | 3/2005 | Tell et al. | 704/203 |
| 2005/0143989 | A1 * | 6/2005 | Jelinek | 704/226 |
| 2005/0256705 | A1 | 11/2005 | Kazama et al. | |
| 2006/0130637 | A1 | 6/2006 | Crebouw | |
| 2006/0224381 | A1 * | 10/2006 | Makinen | 704/223 |
| 2007/0088540 | A1 * | 4/2007 | Ohta et al. | 704/216 |
| 2007/0174052 | A1 * | 7/2007 | Manjunath et al. | 704/219 |
| 2008/0033718 | A1 * | 2/2008 | Zopf et al. | 704/229 |

FOREIGN PATENT DOCUMENTS

| | | |
|---|---|---|
| JP | H07-114396 | 5/1995 |
| JP | H07-334190 | 12/1995 |
| JP | 2002-169579 | 6/2002 |
| JP | 2003-512654 | 4/2003 |
| JP | 2006-350373 | 12/2006 |
| JP | 2007-25290 | 2/2007 |
| RU | 2251750 | 5/2005 |
| WO | 00/37120 | 6/2000 |
| WO | 02/073592 | 9/2002 |

OTHER PUBLICATIONS

WMR-WB, TR 45, "Source-Controlled Variable-Rate Multimode Wideband Speech Codec (VMR-WB), Service Options 62 and 63 for Speech Spectrum Systems", 3GPP2 Technical Specification C.S0052-A v1.0, TIA1016-A, http://www.3gpp2.org, Mar. 18, 2005, pp. 1-198.

Johnston, "Transform Coding of Audio Signals Using Perceptual Noise Criteria", IEEE Journal on Selected Areas in Communications, vol. 6, No. 2, Feb. 1988, pp. 314-323.

ITU-T Telecommunication Standardization Sector of ITU, G.718, Series G: Transmission Systems and Media, Digital Systems and Networks, Digital Terminal Equipments—Coding of Voice and Audio Signals, "Frame Error Robust Narrow-Band and Wideband Embedded Variable Bit-Rate Coding of Speech and Audio from 8-32 Kbit/s", Jun. 2008, pp. 1-259.

ITU-T Telecommunication Standardization Sector of ITU, G. 729, Series G: Transmission Systems and Media, Digital Systems and Networks, Digital Terminal Equipments—Coding of Analogue Signals by Methods other than PCM, "Coding of Speech at 8 Kbit/s Using Conjugate-Structure Algebraic-Code-Excited Linear Prediction (CS-ACELP)", Jan. 2007, pp. 1-146.

ITU-T Telecommunication Standardization Sector of ITU, G. 729.1, Series G: Transmission Systems and Media, Digital Systems and Networks, Digital Terminal Equipments—Coding of Analogue Signals by Methods other than PCM, "G.729-Based Embedded Variable Bit-Rate Coder: An 8-32 Kbit/S Scalable Wideband Coder Bitstream Interoperable with G.729", May 2006, pp. 1-100.

3GPP TS 26.404 V2.0.0 "Enhanced aacPlus General Audio Codec; Encoder Specification; Spectral Band Replication (SBR) part (Release 6)", Technical Specification Group Services and System Aspects Meeting #25, Palm Springs, USA, http://www.3gpp.org/ftp/tsg_sa/TSG_SA/TSGS_25/docs/PDF/SF-040636.pdf, Sep. 2004, 34 sheets.

Deriche et al., "A New Approach to Low Bitrate Audio Coding Using a Combined Harmonic-Multiband-Wavelet Representation", IEEE Fifth International Symposium on Signal Processing and its Applications (ISSPA), Aug. 22-25, 1999, pp. 603-606.

Jelinek et al., "Noise Reduction Method for Wideband Speech Coding", European Signal Processing Conference EUSIPCO 2004, pp. 1959-1962.

* cited by examiner

METHOD AND DEVICE FOR SOUND ACTIVITY DETECTION AND SOUND SIGNAL CLASSIFICATION

FIELD OF THE INVENTION

The present invention relates to sound activity detection, background noise estimation and sound signal classification where sound is understood as a useful signal. The present invention also relates to corresponding sound activity detector, background noise estimator and sound signal classifier.

In particular but not exclusively:

The sound activity detection is used to select frames to be encoded using techniques optimized for inactive frames.

The sound signal classifier is used to discriminate among different speech signal classes and music to allow for more efficient encoding of sound signals, i.e. optimized encoding of unvoiced speech signals, optimized encoding of stable voiced speech signals, and generic encoding of other sound signals.

An algorithm is provided and uses several relevant parameters and features to allow for a better choice of coding mode and more robust estimation of the background noise.

Tonal stability estimation is used to improve the performance of sound activity detection in the presence of music signals, and to better discriminate between unvoiced sounds and music. For example, the tonal stability estimation may be used in a super-wideband codec to decide the codec model to encode the signal above 7 kHz.

BACKGROUND OF THE INVENTION

Demand for efficient digital narrowband and wideband speech coding techniques with a good trade-off between the subjective quality and bit rate is increasing in various application areas such as teleconferencing, multimedia, and wireless communications. Until recently, telephone bandwidth constrained into a range of 200-3400 Hz has mainly been used in speech coding applications (signal sampled at 8 kHz). However, wideband speech applications provide increased intelligibility and naturalness in communication compared to the conventional telephone bandwidth. In wideband services the input signal is sampled at 16 kHz and the encoded bandwidth is in the range 50-7000 Hz. This bandwidth has been found sufficient for delivering a good quality giving an impression of nearly face-to-face communication. Further quality improvement is achieved with so-called super-wideband, in which the signal is sampled at 32 kHz and the encoded bandwidth is in the range 50-15000 Hz. For speech signals this provides a face-to-face quality since almost all energy in human speech is below 14000 Hz. This bandwidth also gives significant quality improvement with general audio signals including music (wideband is equivalent to AM radio and super-wideband is equivalent to FM radio). Higher bandwidth has been used for general audio signals with the full-band 20-20000 Hz (CD quality sampled at 44.1 kHz or 48 kHz).

A sound encoder converts a sound signal (speech or audio) into a digital bit stream which is transmitted over a communication channel or stored in a storage medium. The sound signal is digitized, that is, sampled and quantized with usually 16-bits per sample. The sound encoder has the role of representing these digital samples with a smaller number of bits while maintaining a good subjective quality. The sound decoder operates on the transmitted or stored bit stream and converts it back to a sound signal.

Code-Excited Linear Prediction (CELP) coding is one of the best prior techniques for achieving a good compromise between the subjective quality and bit rate. This coding technique is a basis of several speech coding standards both in wireless and wireline applications. In CELP coding, the sampled speech signal is processed in successive blocks of L samples usually called frames, where L is a predetermined number corresponding typically to 10-30 ms. A linear prediction (LP) filter is computed and transmitted every frame. The L-sample frame is divided into smaller blocks called subframes. In each subframe, an excitation signal is usually obtained from two components, the past excitation and the innovative, fixed-codebook excitation. The component formed from the past excitation is often referred to as the adaptive codebook or pitch excitation. The parameters characterizing the excitation signal are coded and transmitted to the decoder, where the reconstructed excitation signal is used as the input of the LP filter.

The use of source-controlled variable bit rate (VBR) speech coding significantly improves the system capacity. In source-controlled VBR coding, the codec uses a signal classification module and an optimized coding model is used for encoding each speech frame based on the nature of the speech frame (e.g. voiced, unvoiced, transient, background noise). Further, different bit rates can be used for each class. The simplest form of source-controlled VBR coding is to use voice activity detection (VAD) and encode the inactive speech frames (background noise) at a very low bit rate. Discontinuous transmission (DTX) can further be used where no data is transmitted in the case of stable background noise. The decoder uses comfort noise generation (CNG) to generate the background noise characteristics. VAD/DTX/CNG results in significant reduction in the average bit rate, and in packet-switched applications it reduces significantly the number of routed packets. VAD algorithms work well with speech signals but may result in severe problems in case of music signals. Segments of music signals can be classified as unvoiced signals and consequently may be encoded with unvoiced-optimized model which severely affects the music quality. Moreover, some segments of stable music signals may be classified as stable background noise and this may trigger the update of background noise in the VAD algorithm which results in degradation in the performance of the algorithm. Therefore, it would be advantageous to extend the VAD algorithm to better discriminate music signals. In the present disclosure, this algorithm will be referred to as Sound Activity Detection (SAD) algorithm where sound could be speech or music or any useful signal. The present disclosure also describes a method for tonal stability detection used to improve the performance of the SAD algorithm in case of music signals.

Another aspect in speech and audio coding is the concept of embedded coding, also known as layered coding. In embedded coding, the signal is encoded in a first layer to produce a first bit stream, and then the error between the original signal and the encoded signal from the first layer is further encoded to produce a second bit stream. This can be repeated for more layers by encoding the error between the original signal and the coded signal from all preceding layers. The bit streams of all layers are concatenated for transmission. The advantage of layered coding is that parts of the bit stream (corresponding to upper layers) can be dropped in the network (e.g. in case of congestion) while still being able to decode the signal at the receiver depending on the number of received layers. Layered encoding is also useful in multicast applications where the encoder produces the bit stream of all layers and the network decides to send different bit rates to different end points depending on the available bit rate in each link.

Embedded or layered coding can be also useful to improve the quality of widely used existing codecs while still maintaining interoperability with these codecs. Adding more layers to the standard codec core layer can improve the quality and even increase the encoded audio signal bandwidth. Examples are the recently standardized ITU-T Recommendation G.729.1 where the core layer is interoperable with widely used G.729 narrowband standard at 8 kbit/s and upper layers produces bit rates up to 32 kbit/s (with wideband signal starting from 16 kbit/s). Current standardization work aims at adding more layers to produce a super-wideband codec (14 kHz bandwidth) and stereo extensions. Another example is ITU-T Recommendation G.718 for encoding wideband signals at 8, 12, 16, 24 and 32 kbit/s. The codec is also being extended to encode super-wideband and stereo signals at higher bit rates.

The requirements for embedded codecs usually ask for good quality in case of both speech and audio signals. Since speech can be encoded at relatively low bit rate using a model based approach, the first layer (or first two layers) is (or are) encoded using a speech specific technique and the error signal for the upper layers is encoded using a more generic audio encoding technique. This delivers a good speech quality at low bit rates and good audio quality as the bit rate is increased. In G.718 and G.729.1, the first two layers are based on ACELP (Algebraic Code-Excited Linear Prediction) technique which is suitable for encoding speech signals. In the upper layers, transform-based encoding suitable for audio signals is used to encode the error signal (the difference between the original signal and the output from the first two layers). The well known MDCT (Modified Discrete Cosine Transform) transform is used, where the error signal is transformed in the frequency domain. In the super-wideband layers, the signal above 7 kHz is encoded using a generic coding model or a tonal coding model. The above mentioned tonal stability detection can also be used to select the proper coding model to be used.

SUMMARY OF THE INVENTION

According to a first aspect of the present invention, there is provided a method for estimating a tonal stability of a sound signal. The method comprises: calculating a current residual spectrum of the sound signal; detecting peaks in the current residual spectrum; calculating a correlation map between the current residual spectrum and a previous residual spectrum for each detected peak; and calculating a long-term correlation map based on the calculated correlation map, the long-term correlation map being indicative of a tonal stability in the sound signal.

According to a second aspect of the present invention, there is provided a device for estimating a tonal stability of a sound signal. The device comprises: means for calculating a current residual spectrum of the sound signal; means for detecting peaks in the current residual spectrum; means for calculating a correlation map between the current residual spectrum and a previous residual spectrum for each detected peak; and means for calculating a long-term correlation map based on the calculated correlation map, the long-term correlation map being indicative of a tonality in the sound signal.

According to a third aspect of the present invention, there is provided a device for estimating a tonal stability of a sound signal. The device comprises: a calculator of a current residual spectrum of the sound signal; a detector of peaks in the current residual spectrum; a calculator of a correlation map between the current residual spectrum and a previous residual spectrum for each detected peak; and a calculator of a long-term correlation map based on the calculated correlation map, the long-term correlation map being indicative of a tonal stability in the sound signal.

The foregoing and other objects, advantages and features of the present invention will become more apparent upon reading of the following non restrictive description of an illustrative embodiment thereof, given by way of example only with reference to the accompanying drawings.

DETAILED DESCRIPTION

In the non-restrictive, illustrative embodiment of the present invention, sound activity detection (SAD) is performed within a sound communication system to classify short-time frames of signals as sound or background noise/silence. The sound activity detection is based on a frequency dependent signal-to-noise ratio (SNR) and uses an estimated background noise energy per critical band. A decision on the update of the background noise estimator is based on several parameters including parameters discriminating between background noise/silence and music, thereby preventing the update of the background noise estimator on music signals.

The SAD corresponds to a first stage of the signal classification. This first stage is used to discriminate inactive frames for optimized encoding of inactive signal. In a second stage, unvoiced speech frames are discriminated for optimized encoding of unvoiced signal. At this second stage, music detection is added in order to prevent classifying music as unvoiced signal. Finally, in a third stage, voiced signals are discriminated through further examination of the frame parameters.

The herein disclosed techniques can be deployed with either narrowband (NB) sound signals sampled at 8000 sample/s or wideband (WB) sound signals sampled at 16000 sample/s, or at any other sampling frequency. The encoder used in the non-restrictive, illustrative embodiment of the present invention is based on AMR-WB [*AMR Wideband Speech Codec: Transcoding Functions,* 3GPP Technical Specification TS 26.190 (http://wvww.3gpp.org)] and VMR-WB [*Source-Controlled Variable-Rate Multimode Wideband Speech Codec* (*VMR-WB*), *Service Options* 62 *and* 63 *for Spread Spectrum Systems,* 3GPP2 Technical Specification C.S0052-A v1.0, April 2005 (http://www.3gpp2.org)] codecs which use an internal sampling conversion to convert the signal sampling frequency to 12800 sample/s (operating in a 6.4 kHz bandwidth). Thus the sound activity detection technique in the non-restrictive, illustrative embodiment operates on either narrowband or wideband signals after sampling conversion to 12.8 kHz.

Figure 1:
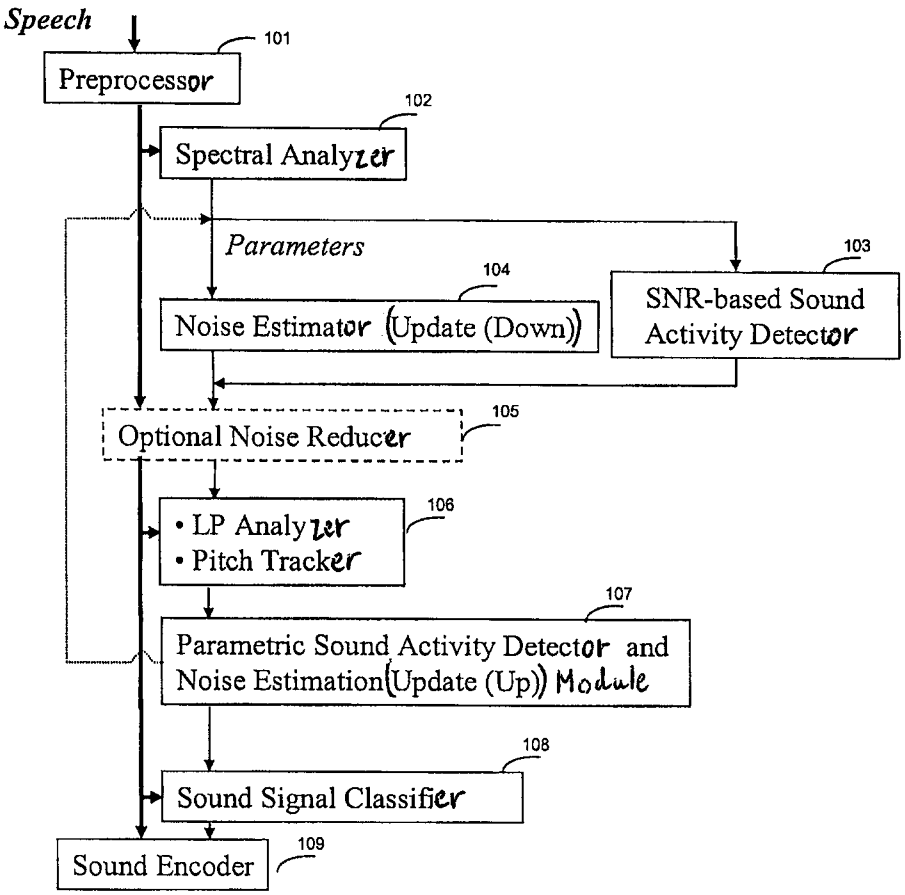
FIG. 1 is a schematic block diagram of a portion of an example of sound communication system including sound activity detection, background noise estimation update, and sound signal classification.

FIG. 1 is a block diagram of a sound communication system 100 according to the non-restrictive illustrative embodiment of the invention, including sound activity detection.

The sound communication system 100 of FIG. 1 comprises a pre-processor 101. Preprocessing by module 101 can be performed as described in the following example (high-pass filtering, resampling and pre-emphasis).

Prior to the frequency conversion, the input sound signal is high-pass filtered. In this non-restrictive, illustrative embodiment, the cut-off frequency of the high-pass filter is 25 Hz for WB and 100 Hz for NB. The high-pass filter serves as a precaution against undesired low frequency components. For example, the following transfer function can be used:

$$H_{h1}(z)=\frac{b_0+b_1z^{-1}+b_2z^{-2}}{1+a_1z^{-1}+a_2z^{-2}}$$

where, for WB, $b_0$=0.9930820, $b_1$=−1.98616407, $b_2$=0.9930820, $a_1$=−1.9861162, $a_2$=0.9862119292 and, for NB, $b_0$=0.945976856, $b_1$=−1.891953712, $b_2$=0.945976856, $a_1$=−1.889033079, $a_2$=0.894874345. Obviously, the high-pass filtering can be alternatively carried out after resampling to 12.8 kHz.

In the case of WB, the input sound signal is decimated from 16 kHz to 12.8 kHz. The decimation is performed by an upsampler that upsamples the sound signal by 4. The resulting output is then filtered through a low-pass FIR (Finite Impulse Response) filter with a cut off frequency at 6.4 kHz. Then, the low-pass filtered signal is downsampled by 5 by an appropriate downsampler. The filtering delay is 15 samples at a 16 kHz sampling frequency.

In the case of NB, the sound signal is upsampled from 8 kHz to 12.8 kHz. For that purpose, an upsampler performs on the sound signal an upsampling by 8. The resulting output is then filtered through a low-pass FIR filter with a cut off frequency at 6.4 kHz. A downsampler then downsamples the low-pass filtered signal by 5. The filtering delay is 16 samples at 8 kHz sampling frequency.

After the sampling conversion, a pre-emphasis is applied to the sound signal prior to the encoding process. In the pre-emphasis, a first order high-pass filter is used to emphasize higher frequencies. This first order high-pass filter forms a pre-emphasizer and uses, for example, the following transfer function:

$$H_{pre\text{-}emph}(z)=1-0.68z^{-1}$$

Pre-emphasis is used to improve the codec performance at high frequencies and improve perceptual weighting in the error minimization process used in the encoder.

As described hereinabove, the input sound signal is converted to 12.8 kHz sampling frequency and preprocessed, for example as described above. However, the disclosed techniques can be equally applied to signals at other sampling frequencies such as 8 kHz or 16 kHz with different preprocessing or without preprocessing.

Figure 2:
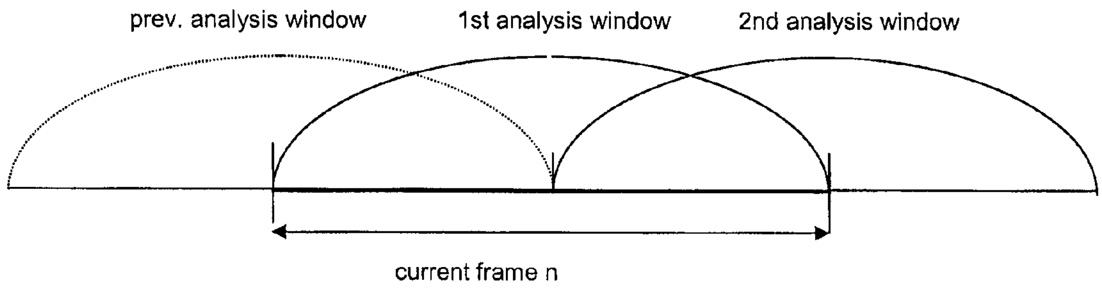
FIG. 2 is a non-limitative illustration of windowing in spectral analysis.

In the non-restrictive illustrative embodiment of the present invention, the encoder 109 (FIG. 1) using sound activity detection operates on 20 ms frames containing 256 samples at the 12.8 kHz sampling frequency. Also, the encoder 109 uses a 10 ms look ahead from the future frame to perform its analysis (FIG. 2). The sound activity detection follows the same framing structure.

Referring to FIG. 1, spectral analysis is performed in spectral analyzer 102. Two analyses are performed in each frame using 20 ms windows with 50% overlap. The windowing principle is illustrated in FIG. 2. The signal energy is computed for frequency bins and for critical bands [J. D. Johnston, "Transform coding of audio signal using perceptual noise criteria," *IEEE J. Select. Areas Commun.*, vol. 6, pp. 314-323, February 1988].

Sound activity detection (first stage of signal classification) is performed in the sound activity detector 103 using noise energy estimates calculated in the previous frame. The output of the sound activity detector 103 is a binary variable which is further used by the encoder 109 and which determines whether the current frame is encoded as active or inactive.

Noise estimator 104 updates a noise estimation downwards (first level of noise estimation and update), i.e. if in a critical band the frame energy is lower than an estimated energy of the background noise, the energy of the noise estimation is updated in that critical band.

Noise reduction is optionally applied by an optional noise reducer 105 to the speech signal using for example a spectral subtraction method. An example of such a noise reduction scheme is described in [M. Jelínek and R. Salami, "Noise Reduction Method for Wideband Speech Coding," in *Proc. Eusipco*, Vienna, Austria, September 2004].

Linear prediction (LP) analysis and open-loop pitch analysis are performed (usually as a part of the speech coding algorithm) by a LP analyzer and pitch tracker 106. In this non-restrictive illustrative embodiment, the parameters resulting from the LP analyzer and pitch tracker 106 are used in the decision to update the noise estimates in the critical bands as performed in module 107. Alternatively, the sound activity detector 103 can also be used to take the noise update decision. According to a further alternative, the functions implemented by the LP analyzer and pitch tracker 106 can be an integral part of the sound encoding algorithm.

Prior to updating the noise energy estimates in module 107, music detection is performed to prevent false updating on active music signals. Music detection uses spectral parameters calculated by the spectral analyzer 102.

Finally, the noise energy estimates are updated in module 107 (second level of noise estimation and update). This module 107 uses all available parameters calculated previously in modules 102 to 106 to decide about the update of the energies of the noise estimation.

In signal classifier 108, the sound signal is further classified as unvoiced, stable voiced or generic. Several parameters are calculated to support this decision. In this signal classifier, the mode of encoding the sound signal of the current frame is chosen to best represent the class of signal being encoded.

Sound encoder 109 performs encoding of the sound signal based on the encoding mode selected in the sound signal classifier 108. In other applications, the sound signal classifier 108 can be an automatic speech recognition system.

Spectral Analysis

The spectral analysis is performed by the spectral analyzer 102 of FIG. 1.

Fourier Transform is used to perform the spectral analysis and spectrum energy estimation. The spectral analysis is done twice per frame using a 256-point Fast Fourier Transform (FFT) with a 50 percent overlap (as illustrated in FIG. 2). The analysis windows are placed so that all look ahead is exploited. The beginning of the first window is at the beginning of the encoder current frame. The second window is placed 128 samples further. A square root Hanning window (which is equivalent to a sine window) has been used to weight the input sound signal for the spectral analysis. This window is particularly well suited for overlap-add methods (thus this particular spectral analysis is used in the noise suppression based on spectral subtraction and overlap-add analysis/synthesis). The square root Harming window is given by:

$$w_{FFT}(n) = \sqrt{0.5 - 0.5\cos\left(\frac{2\pi n}{L_{FFT}}\right)} = \sin\left(\frac{\pi n}{L_{FFT}}\right), \quad n = 0, \ldots, L_{FFT} - 1 \tag{1}$$

where $L_{FFT}$=256 is the size of the FTT analysis. Here, only half the window is computed and stored since this window is symmetric (from 0 to $L_{FFT}/2$).

The windowed signals for both spectral analyses (first and second spectral analyses) are obtained using the two following relations:

$$x_w^{(1)}(n) = w_{FFT}(n)s'(n),\ n=0, \ldots, L_{FFT}-1$$

$$x_w^{(2)}(n) = w_{FFT}(n)s'(n+L_{FFT}/2),\ n=0, \ldots, L_{FFT}-1$$

where s'(0) is the first sample in the current frame. In the non-restrictive, illustrative embodiment of the present invention, the beginning of the first window is placed at the beginning of the current frame. The second window is placed 128 samples further.

FFT is performed on both windowed signals to obtain following two sets of spectral parameters per frame:

$$X^{(1)}(k) = \sum_{n=0}^{N-1} x_w^{(1)}(n)e^{-j2\pi\frac{kn}{N}},\ k = 0, \ldots, L_{FFT} - 1$$

$$X^{(2)}(k) = \sum_{n=0}^{N-1} x_w^{(2)}(n)e^{-j2\pi\frac{kn}{N}},\ k = 0, \ldots, L_{FFT} - 1$$

where N=$L_{FFT}$.

The FFT provides the real and imaginary parts of the spectrum denoted by $X_R(k)$, k=0 to 128, and $X_I(k)$, k=1 to 127. $X_R(0)$ corresponds to the spectrum at 0 Hz (DC) and $X_R(128)$ corresponds to the spectrum at 6400 Hz. The spectrum at these points is only real valued.

After FFT analysis, the resulting spectrum is divided into critical bands using the intervals having the following upper limits [M. Jelínek and R. Salami, "Noise Reduction Method for Wideband Speech Coding," in *Proc. Eusipco*, Vienna, Austria, September 2004] (20 bands in the frequency range 0-6400 Hz):

Critical bands={100.0, 200.0, 300.0, 400.0, 510.0, 630.0, 770.0, 920.0, 1080.0, 1270.0, 1480.0, 1720.0, 2000.0, 2320.0, 2700.0, 3150.0, 3700.0, 4400.0, 5300.0, 6350.0} Hz.

The 256-point FFT results in a frequency resolution of 50 Hz (6400/128). Thus after ignoring the DC component of the spectrum, the number of frequency bins per critical band is $M_{CB}$={2, 2, 2, 2, 2, 2, 3, 3, 3, 4, 4, 5, 6, 6, 8, 9, 11, 14, 18, 21}, respectively.

The average energy in a critical band is computed using the following relation:

$$E_{CB}(i) = \frac{1}{(L_{FFT}/2)^2 M_{CB}(i)} \sum_{k=0}^{M_{CB}(i)-1} (X_R^2(k + j_i) + X_I^2(k + j_i)), \quad i = 0, \ldots, 19 \tag{2}$$

where $X_R(k)$ and $X_I(k)$ are, respectively, the real and imaginary parts of the $k^{th}$ frequency bin and $j_i$ is the index of the first bin in the $i^{th}$ critical band given by $j_i$={1, 3, 5, 7, 9, 11, 13, 16, 19, 22, 26, 30, 35, 41, 47, 55, 64, 75, 89, 107}.

The spectral analyzer 102 also computes the normalized energy per frequency bin, $E_{BIN}(k)$, in the range 0-6400 Hz, using the following relation:

$$E_{BIN}(k) = \frac{4}{L_{FFT}^2}(X_R^2(k) + X_I^2(k)),\ k = 1, \ldots, 127 \tag{3}$$

Furthermore, the energy spectra per frequency bin in both analyses are combined together to obtain the average log-energy spectrum (in decibels), i.e.

$$E_{dB}(k) = 10\log\left[\frac{1}{2}(E_{BIN}^{(1)}(k) + E_{BIN}^{(2)}(k))\right],\ k = 1, \ldots, 127, \tag{4}$$

where the superscripts (1) and (2) are used to denote the first and the second spectral analysis, respectively.

Finally, the spectral analyzer 102 computes the average total energy for both the first and second spectral analyses in a 20 ms frame by adding the average critical band energies $E_{CB}$. That is, the spectrum energy for a certain spectral analysis is computed using the following relation:

$$E_{frame} = \sum_{i=0}^{19} E_{CB}(i) \tag{5}$$

and the total frame energy is computed as the average of spectrum energies of both the first and second spectral analyses in a frame. That is $$E_t = 10\log(0.5(E_{frame}(0) + E_{frame}(1))),\ dB. \tag{6}$$

The output parameters of the spectral analyzer 102, that is the average energy per critical band, the energy per frequency bin and the total energy, are used in the sound activity detector 103 and in the rate selection. The average log-energy spectrum is used in the music detection.

In narrowband input signals sampled at 8000 sample/s, after sampling conversion to 12800 sample/s, there is no content at both ends of the spectrum, thus the first lower frequency critical band as well as the last three high frequency bands are not considered in the computation of relevant parameters (only bands from i=1 to 16 are considered). However, equations (3) and (4) are not affected.

Sound Activity Detection (SAD)

The sound activity detection is performed by the SNR-based sound activity detector 103 of FIG. 1.

The spectral analysis described above is performed twice per frame by the analyzer 102. Let $E_{CB}^{(1)}(i)$ and $E_{CB}^{(2)}(i)$ as computed in Equation (2) denote the energy per critical band information in the first and second spectral analyses, respectively. The average energy per critical band for the whole frame and part of the previous frame is computed using the following relation:

$$E_{av}(i)=0.2E_{CB}^{(0)}(i)+0.4E_{CB}^{(1)}(i)+0.4E_{CB}^{(2)}(i) \quad (7)$$

where $E_{CB}^{(0)}(i)$ denotes the energy per critical band information from the second spectral analysis of the previous frame. The signal-to-noise ratio (SNR) per critical band is then computed using the following relation:

$$SNR_{CB}(i)=E_{av}(i)/N_{CB}(i) \text{ bounded by } SNR_{CB}\geq 1. \quad (8)$$

where $N_{CB}(i)$ is the estimated noise energy per critical band as will be explained below. The average SNR per frame is then computed as $$SNR_{av}=10\log\left(\sum_{i=b_{min}}^{b_{max}} SNR_{CB}(i)\right), \quad (9)$$

where $b_{min}=0$ and $b_{max}=19$ in the case of wideband signals, and $b_{min}=1$ and $b_{max}=16$ in case of narrowband signals.

The sound activity is detected by comparing the average SNR per frame to a certain threshold which is a function of the long-term SNR. The long-term SNR is given by the following relation:

$$SNR_{LT}=\overline{E}_f-\overline{N}_f \quad (10)$$

where $\overline{E}_f$ and $\overline{N}_f$ are computed using equations (13) and (14), respectively, which will be described later. The initial value of $\overline{E}_f$ is 45 dB.

The threshold is a piece-wise linear function of the long-term SNR. Two functions are used, one optimized for clean speech and one optimized for noisy speech.

For wideband signals, If $SNR_{LT}<35$ (noisy speech) then the threshold is equal to:

$$th_{SAD}=0.41287\ SNR_{LT}+13.259625$$

else (clean speech):

$$th_{SAD}=1.0333\ SNR_{LT}-18$$

For narrowband signals, If $SNR_{LT}<20$ (noisy speech) then the threshold is equal to:

$$th_{SAD}=0.1071\ SNR_{LT}+16.5$$

else (clean speech):

$$th_{SAD}=0.4773\ SNR_{LT}-6.1364$$

Furthermore, a hysteresis in the SAD decision is added to prevent frequent switching at the end of an active sound period. The hysteresis strategy is different for wideband and narrowband signals and comes into effect only if the signal is noisy.

For wideband signals, the hysteresis strategy is applied in the case the frame is in a "hangover period" the length of which varies according to the long-term SNR as follows:

$$l_{hang}=0 \text{ if } SNR_{LT}\geq 35$$

$$l_{hang}=1 \text{ if } 15\leq SNR_{LT}<35.$$

$$l_{hang}=2 \text{ if } SNR_{LT}<15$$

The hangover period starts in the first inactive sound frame after three (3) consecutive active sound frames. Its function consists of forcing every inactive frame during the hangover period as an active frame. The SAD decision will be explained later.

For narrowband signals, the hysteresis strategy consists of decreasing the SAD decision threshold as follows:

$$th_{SAD}=th_{SAD}-5.2 \text{ if } SNR_{LT}<19$$

$$th_{SAD}=th_{SAD}-2 \text{ if } 19\leq SNR_{LT}<35$$

$$th_{SAD}=th_{SAD} \text{ if } 35\leq SNR_{LT}$$

Thus, for noisy signals with low SNR, the threshold becomes lower to give preference to active signal decision. There is no hangover for narrowband signals.

Finally, the sound activity detector 103 has two outputs—a SAD flag and a local SAD flag. Both flags are set to one if active signal is detected and set to zero otherwise. Moreover, the SAD flag is set to one in hangover period. The SAD decision is done by comparing the average SNR per frame with the SAD decision threshold (via a comparator for example), that is:

```
if SNR_av > th_SAD
    SAD_local = 1
    SAD = 1
else
    SAD_local = 0
    if in hangover period
        SAD = 1
    else
        SAD = 0
    end
end.
```

First Level of Noise Estimation and Update

A noise estimator 104 as illustrated in FIG. 1 calculates the total noise energy, relative frame energy, update of long-term average noise energy and long-term average frame energy, average energy per critical band, and a noise correction factor. Further, the noise estimator 104 performs noise energy initialization and update downwards.

The total noise energy per frame is calculated using the following relation:

$$N_{tot}=10\log\left(\sum_{i=0}^{19} N_{CB}(i)\right) \quad (11)$$

where $N_{CB}(i)$ is the estimated noise energy per critical band.

The relative energy of the frame is given by the difference between the frame energy in dB and the long-term average energy. The relative frame energy is calculated using the following relation:

$$E_{rel}=E_t-\overline{E}_f \quad (12)$$

where $E_t$ is given in Equation (6).

The long-term average noise energy or the long-term average frame energy is updated in every frame. In case of active signal frames (SAD flag=1), the long-term average frame energy is updated using the relation:

$$\overline{E}_f=0.99\overline{E}_f+0.01E_t \quad (13)$$

with initial value $\overline{E}_f=45$ dB.

In case of inactive speech frames (SAD flag=0), the long-term average noise energy is updated as follows:

$$\overline{N}_f = 0.99\overline{N}_f + 0.01N_{tot} \quad (14)$$

The initial value of $\overline{N}_f$ is set equal to $N_{tot}$ for the first 4 frames. Also, in the first four (4) frames, the value of $\overline{E}_f$ is bounded by $\overline{E}_f \geq N_{tot}+10$.

The frame energy per critical band for the whole frame is computed by averaging the energies from both the first and second spectral analyses in the frame using the following relation:

$$\overline{E}_{CB}(i) = 0.5E_{CB}^{(1)}(i) + 0.5E_{CB}^{(2)}(i) \quad (15)$$

The noise energy per critical band $N_{CB}(i)$ is initialized to 0.03.

At this stage, only noise energy update downward is performed for the critical bands whereby the energy is less than the background noise energy. First, the temporary updated noise energy is computed using the following relation:

$$N_{tmp}(i) = 0.9N_{CB}(i) + 0.1(0.25E_{CB}^{(0)}(i) + 0.75\overline{E}_{CB}(i)) \quad (18)$$

where $E_{CB}^{(0)}(i)$ denotes the energy per critical band corresponding to the second spectral analysis from the previous frame.

Then for i=0 to 19, if $N_{tmp}(i)<N_{CB}(i)$ then $N_{CB}(i)=N_{tmp}(i)$.

A second level of noise estimation and update is performed later by setting $N_{CB}(i)=N_{tmp}(i)$ if the frame is declared as an inactive frame.

Second Level of Noise Estimation and Update

The parametric sound activity detection and noise estimation update module 107 updates the noise energy estimates per critical band to be used in the sound activity detector 103 in the next frame. The update is performed during inactive signal periods. However, the SAD decision performed above, which is based on the SNR per critical band, is not used for determining whether the noise energy estimates are updated. Another decision is performed based on other parameters rather independent of the SNR per critical band. The parameters used for the update of the noise energy estimates are: pitch stability, signal non-stationarity, voicing, and ratio between the 2$^{nd}$ order and 16$^{th}$ order LP residual error energies and have generally low sensitivity to the noise level variations. The decision for the update of the noise energy estimates is optimized for speech signals. To improve the detection of active music signals, the following other parameters are used: spectral diversity, complementary non-stationarity, noise character and tonal stability. Music detection will be explained in detail in the following description.

The reason for not using the SAD decision for the update of the noise energy estimates is to make the noise estimation robust to rapidly changing noise levels. If the SAD decision was used for the update of the noise energy estimates, a sudden increase in noise level would cause an increase of SNR even for inactive signal frames, preventing the noise energy estimates to update, which in turn would maintain the SNR high in the following frames, and so on. Consequently, the update would be blocked and some other logic would be needed to resume the noise adaptation.

In the non-restrictive illustrative embodiment of the present invention, an open-loop pitch analysis is performed in a LP analyzer and pitch tracker module 106 in FIG. 1) to compute three open-loop pitch estimates per frame: $d_0$, $d_1$ and $d_2$ corresponding to the first half-frame, second half-frame, and the lookahead, respectively. This procedure is well known to those of ordinary skill in the art and will not be further described in the present disclosure (e.g. VMR-WB [*Source-Controlled Variable-Rate Multimode Wideband Speech Codec* (*VMR-WB*), *Service Options* 62 *and* 63 *for Spread Spectrum Systems,* 3GPP2 Technical Specification C.S0052-A v1.0, April 2005 (http://www.3gpp2.org)]). The LP analyzer and pitch tracker module 106 calculates a pitch stability counter using the following relation:

$$pc = |d_0 - d_{-1}| + |d_1 - d_0| + |d_2 - d_1| \quad (19)$$

where $d_{-1}$ is the lag of the second half-frame of the previous frame. For pitch lags larger than 122, the LP analyzer and pitch tracker module 106 sets $d_2=d_1$. Thus, for such lags the value of pc in equation (19) is multiplied by 3/2 to compensate for the missing third term in the equation. The pitch stability is true if the value of pc is less than 14. Further, for frames with low voicing, pc is set to 14 to indicate pitch instability. More specifically:

$$\text{If}(C_{norm}(d_0)+C_{norm}(d_1)+C_{norm}(d_2))/3+r_e<th_{Cpc} \text{ then } pc=14, \quad (20)$$

where $C_{norm}(d)$ is the normalized raw correlation and $r_e$ is an optional correction added to the normalized correlation in order to compensate for the decrease of normalized correlation in the presence of background noise. The voicing threshold $th_{Cpc}=0.52$ for WB, and $th_{Cpc}=0.65$ for NB. The correction factor can be calculated using the following relation:

$$r_e = 0.00024492\, e^{0.1596(N_{tot}-14)} - 0.022$$

where $N_{tot}$ is the total noise energy per frame computed according to Equation (11).

The normalized raw correlation can be computed based on the decimated weighted sound signal $s_{wd}(n)$ using the following equation:

$$C_{norm}(d) = \frac{\sum_{n=0}^{L_{sec}} s_{wd}(t_{start})s_{wd}(t_{start}-d)}{\sqrt{\sum_{n=0}^{L_{sec}} s_{wd}^2(t_{start}) \sum_{n=0}^{L_{sec}} s_{wd}^2(t_{start}-d)}},$$

where the summation limit depends on the delay itself. The weighted signal $s_{wd}(n)$ is the one used in open-loop pitch analysis and given by filtering the pre-processed input sound signal from pre-processor 101 through a weighting filter of the form $A(z/\gamma)/(1-\mu z^{-1})$. The weighted signal $s_{wd}(n)$ is decimated by 2 and the summation limits are given according to:

$$L_{sec}=40 \text{ for } d=10, \ldots, 16$$

$$L_{sec}=40 \text{ for } d=17, \ldots, 31$$

$$L_{sec}=62 \text{ for } d=32, \ldots, 61$$

$$L_{sec}=115 \text{ for } d=62, \ldots, 115$$

These lengths assure that the correlated vector length comprises at least one pitch period which helps to obtain a robust open-loop pitch detection. The instants $t_{start}$ are related to the current frame beginning and are given by:

$$t_{start}=0 \text{ for first half-frame}$$

$$t_{start}=128 \text{ for second half-frame}$$

$$t_{start}=256 \text{ for look-ahead}$$

at 12.8 kHz sampling rate.

The parametric sound activity detection and noise estimation update module 107 performs a signal non-stationarity estimation based on the product of the ratios between the energy per critical band and the average long term energy per critical band.

The average long term energy per critical band is updated using the following relation:

$$E_{CB,LT}(i)=\alpha_e E_{CB,LT}(i)+(1-\alpha_e)\overline{E}_{CB}(i),\ \text{for } i=b_{min} \text{ to } b_{max}, \tag{21}$$

where $b_{min}=0$ and $b_{max}=19$ in the case of wideband signals, and $b_{min}=1$ and $b_{max}=16$ in case of narrowband signals, and $\overline{E}_{CB}(i)$ is the frame energy per critical band defined in Equation (15). The update factor $\alpha_e$ is a linear function of the total frame energy, defined in Equation (6), and it is given as follows:

For wideband signals: $\alpha_e=0.0245E_t-0.235$ bounded by $0.5\leq\alpha_e\leq0.99$.

For narrowband signals: $\alpha_e=0.00091E_t+0.3185$ bounded by $0.5\leq\alpha_e\leq0.999$.

$E_t$ is given by Equation (6).

The frame non-stationarity is given by the product of the ratios between the frame energy and average long term energy per critical band. More specifically:

$$nonstat=\prod_{i=b_{min}}^{b_{max}}\frac{\max(\overline{E}_{CB}(i),\ E_{CB,LT}(i))}{\min(\overline{E}_{CB}(i),\ E_{CB,LT}(i))} \tag{22}$$

The parametric sound activity detection and noise estimation update module 107 further produces a voicing factor for noise update using the following relation:

$$\text{voicing}=(C_{norm}(d_0)+C_{norm}(d_1))/2+r_e \tag{23}$$

Finally, the parametric sound activity detection and noise estimation update module 107 calculates a ratio between the LP residual energy after the $2^{nd}$ order and $16^{th}$ order LP analysis using the relation:

$$\text{resid\_ratio}=E(2)/E(16) \tag{24}$$

where E(2) and E(16) are the LP residual energies after $2^{nd}$ order and $16^{th}$ order LP analysis as computed in the LP analyzer and pitch tracker module 106 using a Levinson-Durbin recursion which is a procedure well known to those of ordinary skill in the art. This ratio reflects the fact that to represent a signal spectral envelope, a higher order of LP is generally needed for speech signal than for noise. In other words, the difference between E(2) and E(16) is supposed to be lower for noise than for active speech.

The update decision made by the parametric sound activity detection and noise estimation update module 107 is determined based on a variable noise_update which is initially set to 6 and is decreased by 1 if an inactive frame is detected and incremented by 2 if an active frame is detected. Also, the variable noise_update is bounded between 0 and 6. The noise energy estimates are updated only when noise_update=0.

The value of the variable noise_update is updated in each frame as follows:

If (nonstat>$th_{stat}$) OR (pc<14) OR (voicing>$th_{Cnorm}$) OR (resid_ratio>$th_{resid}$)

noise_update=noise_update+2

Else noise_update=noise_update−1 where for wideband signals, $th_{stat}=th_{Cnorm}=0.85$ and $th_{resid}=1.6$, and for narrowband signals, $th_{stat}=500000$, $th_{Cnorm}=0.7$ and $th_{resid}=10.4$.

In other words, frames are declared inactive for noise update when (nonstat≤$th_{stat}$) AND (pc≥14) AND (voicing≤$th_{Cnorm}$) AND (resid_ratio≤$th_{resid}$)

and a hangover of 6 frames is used before noise update takes place.

Thus, if noise_update=0 then for $i=0$ to 19 $N_{CB}(i)=N_{tmp}(i)$ where $N_{tmp}(i)$ is the temporary updated noise energy already computed in Equation (18).

Improvement of Noise Detection for Music Signals

The noise estimation described above has its limitations for certain music signals, such as piano concerts or instrumental rock and pop, because it was developed and optimized mainly for speech detection. To improve the detection of music signals in general, the parametric sound activity detection and noise estimation update module 107 uses other parameters or techniques in conjunction with the existing ones. These other parameters or techniques comprise, as described hereinabove, spectral diversity, complementary non-stationarity, noise character and tonal stability, which are calculated by a spectral diversity calculator, a complementary non-stationarity calculator, a noise character calculator and a tonal stability estimator, respectively. They will be described in detail herein below.

Spectral Diversity

Spectral diversity gives information about significant changes of the signal in frequency domain. The changes are tracked in critical bands by comparing energies in the first spectral analysis of the current frame and the second spectral analysis two frames ago. The energy in a critical band i of the first spectral analysis in the current frame is denoted as $E_{CB}^{(1)}(i)$. Let the energy in the same critical band calculated in the second spectral analysis two frames ago be denoted as $E_{CB}^{(-2)}(i)$. Both of these energies are initialized to 0.0001. Then, for all critical bands higher than 9, the maximum and the minimum of the two energies are calculated as follows:

$$\left.\begin{aligned}E_{max}(i)&=\max\{E_{CB}^{(1)}(i),\ E_{CB}^{(-2)}(i)\}\\E_{min}(i)&=\min\{E_{CB}^{(1)}(i),\ E_{CB}^{(-2)}(i)\}\end{aligned}\right\},\ \text{for } i=10,\ \ldots\ ,\ b_{max}.$$

Subsequently, a ratio between the maximum and the minimum energy in a specific critical band is calculated as $$E_{rat}(i)=\frac{E_{max}(i)}{E_{min}(i)},\ \text{for } i=10,\ \ldots\ ,\ b_{max}.$$

Finally, the parametric sound activity detection and noise estimation update module 107 calculates a spectral diversity parameter as a normalized weighted sum of the ratios with the weight itself being the maximum energy $E_{max}(i)$. This spectral diversity parameter is given by the following relation:

$$\text{spec\_div} = \frac{\sum_{i=10}^{b_{max}} E_{max}(i)E_{rat}(i)}{\sum_{i=10}^{b_{max}} E_{max}(i)}. \quad (25)$$

The spec_div parameter is used in the final decision about music activity and noise energy update. The spec_div parameter is also used as an auxiliary parameter for the calculation of a complementary non-stationarity parameter which is described bellow.

Complementary Non-Stationarity

The inclusion of a complementary non-stationarity parameter is motivated by the fact that the non-stationarity parameter, defined in Equation (22), fails when a sharp energy attack in a music signal is followed by a slow energy decrease. In this case the average long term energy per critical band, $E_{CB,LT}(i)$, defined in Equation (21), slowly increases during the attack whereas the frame energy per critical band, defined in Equation (15), slowly decreases. In a certain frame after the attack these two energy values meet and the nonstat parameter results in a small value indicating an absence of active signal. This leads to a false noise update and subsequently a false SAD decision.

To overcome this problem an alternative average long term energy per critical band is calculated using the following relation:

$$E2_{CB,LT}(i)=\beta_e E2_{CB,LT}(i)+(1-\beta_e)\overline{E}_{CB}(i), \text{ for } i=b_{min} \text{ to } b_{max}. \quad (26)$$

The variable $E2_{CB,LT}(i)$ is initialized to 0.03 for all i. Equation (26) closely resembles equation (21) with the only difference being the update factor $\beta_e$ which is given as follows:

if (spec_div > $th_{spec\_div}$)

$\beta_e = 0$ else $\beta_e = \alpha_e$ end, where $th_{spec\_div}$=5. Thus, when an energy attack is detected (spec_div>5) the alternative average long term energy is immediately set to the average frame energy, i.e. $E2_{CB,LT}(i)=\overline{E}_{CB}(i)$. Otherwise this alternative average long term energy is updated in the same way as the conventional non-stationarity, i.e. using the exponential filter with the update factor $\alpha_e$. The complementary non-stationarity parameter is calculated in the same way as nonstat, but using $E2_{CB,LT}(i)$, i.e.

$$nonstat2 = \prod_{i=b_{min}}^{b_{max}} \frac{\max(\overline{E}_{CB}(i), E2_{CB,LT}(i))}{\min(\overline{E}_{CB}(i), E2_{CB,LT}(i))}. \quad (27)$$

The complementary non-stationarity parameter, nonstat2, may fail a few frames right after an energy attack, but should not fail during the passages characterized by a slowly-decreasing energy. Since the nonstat parameter works well on energy attacks and few frames after, a logical disjunction of nonstat and nonstat2 therefore solves the problem of inactive signal detection on certain musical signals. However, the disjunction is applied only in passages which are "likely to be active". The likelihood is calculated as follows:

if (($nonstat > th_{stat}$) OR (tonal_stability= 1))

act_pred_LT = $k_a$act_pred_LT + $(1-k_a)\cdot 1$ else act_pred_LT = $k_a$act_pred_LT + $(1-k_a)\cdot 0$ end.

The coefficient $k_a$ is set to 0.99. The parameter act_pred_LT which is in the range <0:1> may be interpreted as a predictor of activity. When it is close to 1, the signal is likely to be active, and when it is close to 0, it is likely to be inactive. The act_pred_LT parameter is initialized to one. In the condition above, tonal_stability is a binary parameter which is used to detect stable tonal signal. This tonal_stability parameter will be described in the following description.

The nonstat2 parameter is taken into consideration (in disjunction with nonstat) in the update of noise energy only if act_pred_LT is higher than certain threshold, which has been set to 0.8. The logic of noise energy update is explained in detail at the end of the present section.

Noise Character

Noise character is another parameter which is used in the detection of certain noise-like music signals such as cymbals or low-frequency drums. This parameter is calculated using the following relation:

$$\text{noise\_char} = \frac{\sum_{i=10}^{b_{max}} E_{CB}(i)}{\sum_{i=b_{min}}^{9} E_{CB}(i)}. \quad (28)$$

The noise_char parameter is calculated only for the frames whose spectral content has at least a minimal energy, which is fulfilled when both the numerator and the denominator of Equation (28) are larger than 100. The noise_char parameter is upper limited by 10 and its long-term value is updated using the following relation:

$$\text{noise\_char\_LT}=\alpha_n \text{noise\_char\_LT}+(1-\alpha_n)\text{noise\_char} \quad (29)$$

The initial value of noise_char_LT is 0 and $\alpha_n$ is set equal to 0.9. This noise_char_LT parameter is used in the decision about noise energy update which is explained at the end of the present section.

Tonal Stability

Tonal stability is the last parameter used to prevent false update of the noise energy estimates. Tonal stability is also used to prevent declaring some music segments as unvoiced frames. Tonal stability is further used in an embedded super-wideband codec to decide which coding model will be used for encoding the sound signal above 7 kHz. Detection of tonal stability exploits the tonal nature of music signals. In a typical music signal there are tones which are stable over several consecutive frames. To exploit this feature, it is necessary to track the positions and shapes of strong spectral peaks since these may correspond to the tones. The tonal stability detection is based on a correlation analysis between the spectral peaks in the current frame and those of the past frame. The input is the average log-energy spectrum defined in Equation (4). The number of spectral bins is denoted as $N_{SPEC}$ (bin 0 is the DC component and $N_{SPEC}=L_{FFT}/2$). In the following disclosure, the term "spectrum" will refer to the average log-energy spectrum, as defined by Equation (4).

Detection of tonal stability proceeds in three stages. Furthermore, detection of tonal stability uses a calculator of a current residual spectrum, a detector of peaks in the current residual spectrum and a calculator of a correlation map and a long-term correlation map, which will be described hereinabelow.

In the first stage, the indexes of local minima of the spectrum are searched (by a spectrum minima locator for example), in a loop described by the following formula and stored in a buffer $i_{min}$ that can be expressed as follows:

$$i_{min}=(\forall i:(E_{dB}(i-1)>E_{dB}(i))\wedge(E_{dB}(i)<E_{dB}(i+1))\quad i=1, \ldots, N_{SPEC}-2 \tag{30}$$

where the symbol $\wedge$ means logical AND.

In Equation (30), $E_{dB}(i)$ denotes the average log-energy spectrum calculated through Equation (4). The first index in $i_{min}$ is 0, if $E_{dB}(0)<E_{dB}(1)$. Consequently, the last index in $i_{min}$ is $N_{SPEC}-1$, if $E_{dB}(N_{SPEC}-1)<E_{dB}(N_{SPEC}-2)$. Let us denote the number of minima found as $N_{min}$.

The second stage consists of calculating a spectral floor (through a spectral floor estimator for example) and subtracting it from the spectrum (via a suitable subtractor for example). The spectral floor is a piece-wise linear function which runs through the detected local minima. Every linear piece between two consecutive minima $i_{min}(x)$ and $i_{min}(x+1)$ can be described as:

$$fl(j)=k\cdot(j-i_{min}(x))+q\quad j=i_{min}(x), \ldots, i_{min}(x+1),$$

where k is the slope of the line and $q=E_{dB}(i_{min}(x))$. The slope k can be calculated using the following relation:

$$k=\frac{E_{dB}(i_{min}(x+1))-E_{dB}(i_{min}(x))}{i_{min}(x+1)-i_{min}(x)}.$$

Thus, the spectral floor is a logical connection of all pieces:

$$sp\_floor(j)=E_{dB}(j)\quad j=0, \ldots, i_{min}(0)-1$$

$$sp\_floor(j)=fl(j)\quad j=i_{min}(0), \ldots, i_{min}(N_{min}-1)-1.$$

$$sp\_floor(j)=E_{dB}(j)\quad j=i_{min}(N_{min}-1), \ldots, N_{SPEC}-1 \tag{31}$$

Figure 3:
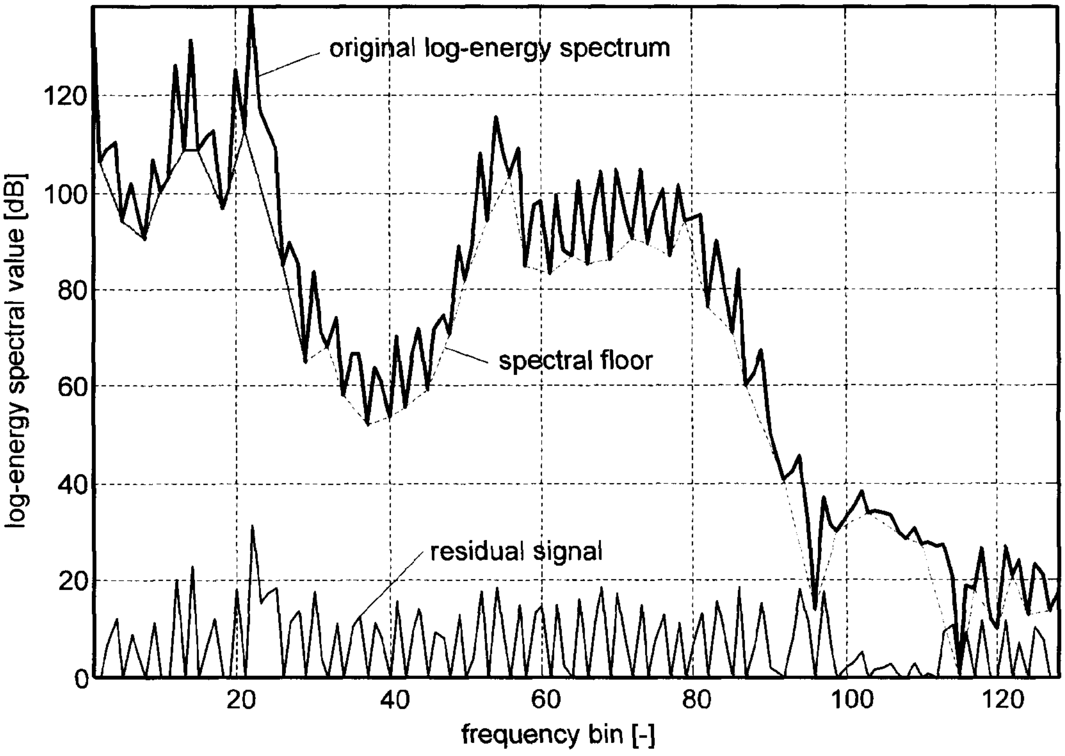
FIG. 3 is a non-restrictive graphical illustration of the principle of spectral floor calculation and the residual spectrum.

The leading bins up to $i_{min}(0)$ and the terminating bins from $i_{min}(N_{min}-1)$ of the spectral floor are set to the spectrum itself. Finally, the spectral floor is subtracted from the spectrum using the following relation:

$$E_{dB,res}(j)=E_{dB}(j)-sp\_floor(j)\quad j=0, \ldots, N_{SPEC}-1 \tag{32}$$

and the result is called the residual spectrum. The calculation of the spectral floor is illustrated in FIG. 3.

In the third stage, a correlation map and a long-term correlation map are calculated from the residual spectrum of the current and the previous frame. This is again a piece-wise operation. Thus, the correlation map is calculated on a peak-by-peak basis since the minima delimit the peaks. In the following disclosure, the term "peak" will be used to denote a piece between two minima in the residual spectrum $E_{db,res}$.

Let us denote the residual spectrum of the previous frame as $E_{dB,res}^{(-1)}(j)$. For every peak in the current residual spectrum a normalized correlation is calculated with the shape in the previous residual spectrum corresponding to the position of this peak. If the signal was stable, the peaks should not move significantly from frame to frame and their positions and shapes should be approximately the same. Thus, the correlation operation takes into account all indexes (bins) of a specific peak, which is delimited by two consecutive minima. More specifically, the normalized correlation is calculated using the following relation:

$$\text{cor\_map}(i_{min}(x):i_{min}(x+1))=\frac{\left(\sum_{j=i_{min}(x)}^{i_{min}(x+1)-1}E_{dB,res}(j)E_{dB,res}^{(-1)}(j)\right)^2}{\sum_{j=i_{min}(x)}^{i_{min}(x+1)-1}(E_{dB,res}(j))^2\sum_{j=i_{min}(x)}^{i_{min}(x+1)}(E_{dB,res}^{(-1)}(j))^2}, \tag{33}$$

$$x=0, \ldots, N_{min}-2$$

Figure 4:
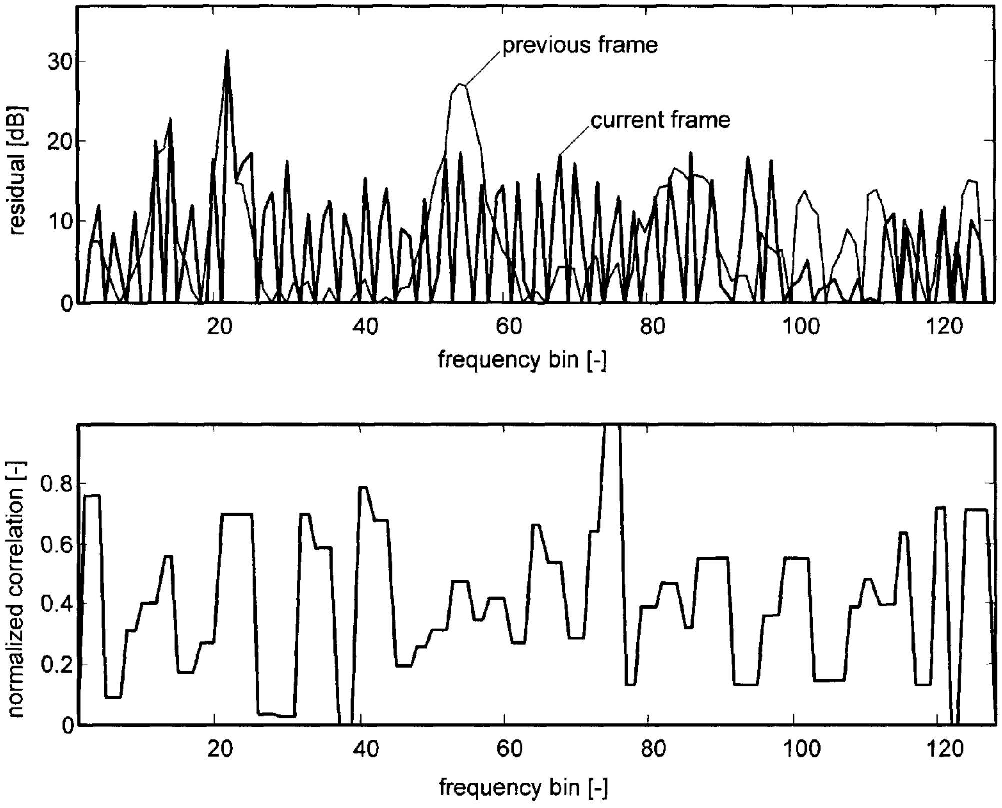
FIG. 4 is a non-limitative illustration of calculation of spectral correlation map in a current frame.

The leading bins of cor_map up to $i_{min}(0)$ and the terminating bins cor_map from $i_{min}(N_{min}-1)$ are set to zero. The correlation map is shown in FIG. 4.

The correlation map of the current frame is used to update its long term value which is described by:

$$\text{cor\_map\_}LT(k)=\alpha_{map}\text{cor\_map\_}LT(k)+(1-\alpha_{map})\text{cor\_map}(k),$$

$$k=0, \ldots, N_{SPEC}-1, \tag{34}$$

where $\alpha_{map}=0.9$. The cor_map_LT is initialized to zero for all k.

Finally, all values of the cor_map_LT are summed together (through an adder for example) as follows:

$$\text{cor\_map\_sum}=\sum_{j=0}^{N_{SPEC}-1}\text{cor\_map\_LT}(j). \tag{35}$$

If any value of the cor_map_LT(j), j=0, . . . , $N_{SPEC}-1$, exceeds a threshold of 0.95, a flag cor_strong (which can be viewed as a detector) is set to one, otherwise it is set to zero.

The decision about tonal stability is calculated by subjecting cor_map_sum to an adaptive threshold, thr_tonal. This threshold is initialized to 56 and is updated in every frame as follows:

```
if (cor_map_sum > 56)
    thr_tonal = thr_tonal − 0.2
else
    thr_tonal = thr_tonal + 0.2
end.
```

The adaptive threshold thr_tonal is upper limited by 60 and lower limited by 49. Thus, the adaptive threshold thr_tonal decreases when the correlation is relatively good indicating an active signal segment and increases otherwise. When the threshold is lower, more frames are likely to be classified as active, especially at the end of active periods. Therefore, the adaptive threshold may be viewed as a hangover.

The tonal_stability parameter is set to one whenever cor_map_sum is higher than thr_tonal or when cor_strong flag is set to one. More specifically:

```
if ((cor_map_sum > thr_tonal) OR (cor_strong = 1))
        tonal_stability = 1
else
        tonal_stability = 0
end.
```

Use of the Music Detection Parameters in Noise Energy Update

All music detection parameters are incorporated in the final decision made in the parametric sound activity detection and noise estimation update (Up) module 107 about update of the noise energy estimates. The noise energy estimates are updated as long as the value of noise_update is zero. Initially, it is set to 6 and updated in each frame as follows:

```
if (nonstat > th_stat) OR (pc < 14) OR
        (voicing > th_Cnorm) OR (resid_ratio > th_resid) OR
        (tonal_stability = 1) OR (noise_char_LT > 0.3)
                OR ((act_pred_LT > 0.8) AND (nonstat2 > th_stat))
    noise_update = noise_update + 2
else
    noise_update = noise_update − 1
end.
```

If the combined condition has a positive result, the signal is active and the noise_update parameter is increased. Otherwise, the signal is inactive and the parameter is decreased. When it reaches 0, the noise energy is updated with the current signal energy.

In addition to the noise energy update, the tonal_stability parameter is also used in the classification algorithm of unvoiced sound signal. Specifically, the parameter is used to improve the robustness of unvoiced signal classification on music as will be described in the following section.

Sound Signal Classification (Sound Signal Classifier 108)

Figure 5:
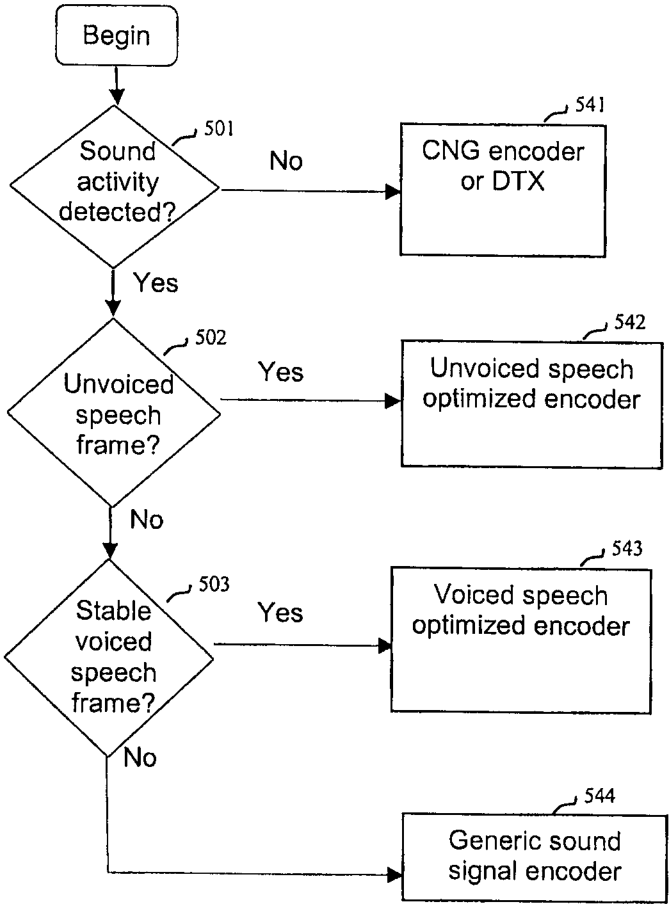
FIG. 5 is an example of functional block diagram of a signal classification algorithm.

The general philosophy under the sound signal classifier 108 (FIG. 1) is depicted in FIG. 5. The approach can be described as follows. The sound signal classification is done in three steps in logic modules 501, 502, and 503, each of them discriminating a specific signal class. First, a signal activity detector (SAD) 501 discriminates between active and inactive signal frames. This signal activity detector 501 is the same as that referred to as signal activity detector 103 in FIG. 1. The signal activity detector has already been described in the foregoing description.

If the signal activity detector 501 detects an inactive frame (background noise signal), then the classification chain ends and, if Discontinuous Transmission (DTX) is supported, an encoding module 541 that can be incorporated in the encoder 109 (FIG. 1) encodes the frame with comfort noise generation (CNG). If DTX is not supported, the frame continues into the active signal classification, and is most often classified as unvoiced speech frame.

If an active signal frame is detected by the sound activity detector 501, the frame is subjected to a second classifier 502 dedicated to discriminate unvoiced speech frames. If the classifier 502 classifies the frame as unvoiced speech signal, the classification chain ends, an encoding module 542 that can be incorporated in the encoder 109 (FIG. 1) encodes the frame with an encoding method optimized for unvoiced speech signals.

Otherwise, the signal frame is processed through to a "stable voiced" classifier 503. If the frame is classified as a stable voiced frame by the classifier 503, then an encoding module 543 that can be incorporated in the encoder 109 (FIG. 1) encodes the frame using a coding method optimized for stable voiced or quasi periodic signals.

Otherwise, the frame is likely to contain a non-stationary signal segment such as a voiced speech onset or rapidly evolving voiced speech or music signal. These frames typically require a general purpose encoding module 544 that can be incorporated in the encoder 109 (FIG. 1) to encode the frame at high bit rate for sustaining good subjective quality.

In the following, the classification of unvoiced and voiced signal frames will be disclosed. The SAD detector 501 (or 103 in FIG. 1) used to discriminate inactive frames has been already described in the foregoing description.

The unvoiced parts of the speech signal are characterized by missing the periodic component and can be further divided into unstable frames, where the energy and the spectrum changes rapidly, and stable frames where these characteristics remain relatively stable. The non-restrictive illustrative embodiment of the present invention proposes a method for the classification of unvoiced frames using the following parameters:

- voicing measure, computed as an averaged normalized correlation ($\bar{r}_x$);
- average spectral tilt measure ($\bar{e}_t$);
- maximum short-time energy increase from low level (dE0) designed to efficiently detect speech plosives in a signal;
- tonal stability to discriminate music from unvoiced signal (described in the foregoing description); and
- relative frame energy ($E_{rel}$) to detect very low-energy signals.

Voicing Measure

The normalized correlation, used to determine the voicing measure, is computed as part of the open-loop pitch analysis made in the LP analyzer and pitch tracker module 106 of FIG. 1. Frames of 20 ms, for example, can be used. The LP analyzer and pitch tracker module 106 usually outputs an open-loop pitch estimate every 10 ms (twice per frame). Here, the LP analyzer and pitch tracker module 106 is also used to produce and output the normalized correlation measures. These normalized correlations are computed on a weighted signal and a past weighted signal at the open-loop pitch delay. The weighted speech signal $s_w(n)$ is computed using a perceptual weighting filter. For example, a perceptual weighting filter with fixed denominator, suited for wideband signals, can be used. An example of a transfer function for the perceptual weighting filter is given by the following relation:

$$W(z) = \frac{A(z/\gamma_1)}{1 - \gamma_2 z^{-1}}, \text{ where } 0 < \gamma_2 < \gamma_1 \le 1$$

where A(z) is the transfer function of a linear prediction (LP) filter computed in the LP analyzer and pitch tracker module 106, which is given by the following relation:

$$A(z) = 1 + \sum_{i=1}^{P} a_i z^{-i}.$$

The details of the LP analysis and open-loop pitch analysis will not be further described in the present specification since they are believed to be well known to those of ordinary skill in the art.

The voicing measure is given by the average correlation $\overline{C}_{norm}$ which is defined as:

$$\overline{C}_{norm} = \frac{1}{3}(C_{norm}(d_0) + C_{norm}(d_1) + C_{norm}(d_2)) + r_e \quad (36)$$

where $C_{norm}(d_0)$, $C_{norm}(d_1)$ and $C_{norm}(d_2)$ are respectively the normalized correlation of the first half of the current frame, the normalized correlation of the second half of the current frame, and the normalized correlation of the lookahead (the beginning of the next frame). The arguments to the correlations are the above mentioned open-loop pitch lags calculated in the LP analyzer and pitch tracker module 106 of FIG. 1. A lookahead of 10 ms can be used, for example. A correction factor $r_e$ is added to the average correlation in order to compensate for the background noise (in the presence of background noise the correlation value decreases). The correction factor is calculated using the following relation:

$$r_e = 0.00024492\, e^{0.1596(N_{tot}-14)} - 0.022 \quad (37)$$

where $N_{tot}$ is the total noise energy per frame computed according to Equation (11).

Spectral Tilt

The spectral tilt parameter contains information about frequency distribution of energy. The spectral tilt can be estimated in the frequency domain as a ratio between the energy concentrated in low frequencies and the energy concentrated in high frequencies. However, it can be also estimated using other methods such as a ratio between the two first autocorrelation coefficients of the signal.

The spectral analyzer 102 in FIG. 1 is used to perform two spectral analyses per frame as described in the foregoing description. The energy in high frequencies and in low frequencies is computed following the perceptual critical bands [M. Jelínek and R. Salami, "Noise Reduction Method for Wideband Speech Coding," in *Proc. Eusipco*, Vienna, Austria, September 2004], repeated here for convenience Critical bands={100.0, 200.0, 300.0, 400.0, 510.0, 630.0, 770.0, 920.0, 1080.0, 1270.0, 1480.0, 1720.0, 2000.0, 2320.0, 2700.0, 3150.0, 3700.0, 4400.0, 5300.0, 6350.0} Hz.

The energy in high frequencies is computed as the average of the energies of the last two critical bands using the following relations:

$$\overline{E}_h = 0.5\,[E_{CB}(b_{max}-1) + E_{CB}(b_{max})] \quad (39)$$

where the critical band energies $E_{CB}(i)$ are calculated according to Equation (2). The computation is performed twice for both spectral analyses.

The energy in low frequencies is computed as the average of the energies in the first 10 critical bands (for NB signals, the very first band is not included), using the following relation:

$$\overline{E}_l = \frac{1}{10 - b_{min}} \sum_{i=b_{min}}^{9} E_{CB}(i). \quad (40)$$

The middle critical bands have been excluded from the computation to improve the discrimination between frames with high energy concentration in low frequencies (generally voiced) and with high energy concentration in high frequencies (generally unvoiced). In between, the energy content is not characteristic for any of the classes and increases the decision confusion.

However, the energy in low frequencies is computed differently for harmonic unvoiced signals with high energy content in low frequencies. This is due to the fact that for voiced female speech segments, the harmonic structure of the spectrum can be exploited to increase the voiced-unvoiced discrimination. The affected signals are either those whose pitch period is shorter than 128 or those which are not considered as a priori unvoiced. A priori unvoiced sound signals must fulfill the following condition:

$$\frac{1}{2}(C_{norm}(d_0) + C_{norm}(d_1)) + r_e < 0.6. \quad (41)$$

Thus, for the signals discriminated by the above condition, the energy in low frequencies is computed bin-wise and only frequency bins sufficiently close to the harmonics are taken into account into the summation. More specifically, the following relation is used:

$$\overline{E}_l = \frac{1}{cnt} \sum_{i=K_{min}}^{25} E_{BIN}(i) w_h(i). \quad (42)$$

where $K_{min}$ is the first bin ($K_{min}$=1 for WB and $K_{min}$=3 for NB) and $E_{BIN}(k)$ are the bin energies, as defined in Equation (3), in the first 25 frequency bins (the DC component is omitted). These 25 bins correspond to the first 10 critical bands. In the summation above, only terms close to the pitch harmonics are considered; $w_h(i)$ is set to 1 if the distance between the nearest harmonics is not larger than a certain frequency threshold (for example 50 Hz) and is set to 0 otherwise; therefore only bins closer than 50 Hz to the nearest harmonics are taken into account. The counter cnt is equal to the number of non-zero terms in the summation. Hence, if the structure is harmonic in low frequencies, only high energy terms will be included in the sum. On the other hand, if the structure is not harmonic, the selection of the terms will be random and the sum will be smaller. Thus even unvoiced sound signals with high energy content in low frequencies can be detected.

The spectral tilt is given by the following relation:

$$e_t = \frac{\overline{E}_l - \overline{N}_l}{\overline{E}_h - \overline{N}_h} \quad (43)$$

where $\overline{N}_h$ and $\overline{N}_l$ are the averaged noise energies in the last two (2) critical bands and the first 10 critical bands (or the first 9 critical bands for NB), respectively, computed in the same way as $\overline{E}_h$ and $\overline{E}_l$ in Equations (39) and (40). The estimated noise energies have been included in the tilt computation to account for the presence of background noise. For NB signals, the missing bands are compensated by multiplying $e_t$ by 6. The spectral tilt computation is performed twice per frame to obtain $e_t(0)$ and $e_t(1)$ corresponding to both the first and second spectral analyses per frame. The average spectral tilt used in unvoiced frame classification is given by $$\bar{e}_t = \frac{1}{3}(e_{old} + e_t(0) + e_t(1)), \tag{44}$$

where $e_{old}$ is the tilt in the second half of the previous frame.

Maximum Short-Time Energy Increase at Low Level

The maximum short-time energy increase at low level dE0 is evaluated on the sound signal s(n), where n=0 corresponds to the beginning of the current frame. For example, 20 ms speech frames are used and every frame is divided into 4 subframes for speech encoding purposes. The signal energy is evaluated twice per subframe, i.e. 8 times per frame, based on short-time segments of a length of 32 samples (at a 12.8 kHz sampling rate). Further, the short-term energies of the last 32 samples from the previous frame are also computed. The short-time energies are computed using the following relation:

$$E_{st}^{(1)}(j) = \max_{i=0}^{31}(s^2(i+32j)),\ j=-1, \ldots, 7, \tag{45}$$

where j=−1 and j=0, . . . , 7 correspond to the end of the previous frame and the current frame, respectively. Another set of 9 maximum energies is computed by shifting the signal indices in Equation (45) by 16 samples. That is $$E_{st}^{(2)}(j) = \max_{i=0}^{31}(s^2(i+32j+16)),\ j=-1, \ldots, 7. \tag{46}$$

For those energies that are sufficiently low, i.e. which fulfill the condition $10\log(E_{st}(j))<37$, the following ratio is calculated:

$$rat^{(1)}(j) = \frac{E_{st}^{(1)}(j+1)}{E_{st}^{(1)}(j)+100},\ \text{for } j=-1, \ldots, 6, \tag{47}$$

for the first set of indices and the same calculation is repeated for $E_{st}^{(2)}(j)$ to obtain two sets of ratios $rat^{(1)}(j)$ and $rat^{(2)}(j)$. The only maximum in these two sets is searched as follows:

$$dE0=\max(\text{rat}^{(1)}(j),\text{rat}^{(2)}(j)) \tag{48}$$

which is the maximum short-time energy increase at low level.

Measure on Background Noise Spectrum Flatness

In this example, inactive frames are usually coded with a coding mode designed for unvoiced speech in the absence of DTX operation. However, in the case of a quasi-periodic background noise, like some car noises, more faithful noise rendering is achieved if generic coding is instead used for WB.

To detect this type of background noise, a measure of background noise spectrum flatness is computed and averaged over time. First, average noise energy is computed for first and last four critical bands as follows:

$$\bar{N}_{l4} = \frac{1}{4}\sum_{i=0}^{3} N_{CB}(i)$$

$$\bar{N}_{h4} = \frac{1}{4}\sum_{i=15}^{19} N_{CB}(i)$$

The flatness measure is then computed using the following relation:

$$f_{noise\_flat}=(\bar{N}_{l4}-\bar{N}_{h4})/\bar{N}_{l4}+0.5[N_{CB}(1)+N_{CB}(2)]/N_{CB}(0)$$

and averaged over time using the following relation:

$$\bar{f}_{noise\_flat}^{[0]}=0.99\bar{f}_{noise\_flat}^{[-1]}+0.01f_{noise\_flat}$$

where $\bar{f}_{noise\_noise}^{[-1]}$ is the averaged flatness measure of the past frame and $\bar{f}_{noise\_flat}^{[0]}$ is the updated value of the averaged flatness measure of the current frame.

Unvoiced Signal Classification

The classification of unvoiced signal frames is based on the parameters described above, namely: the voicing measure $\bar{C}_{norm}$, the average spectral tilt $\bar{e}_t$, the maximum short-time energy increase at low level dE0 and the measure of background noise spectrum flatness, $\bar{f}_{noise\_flat}^{[0]}$. The classification is further supported by the tonal stability parameter and the relative frame energy calculated during the noise energy update phase (module 107 in FIG. 1). The relative frame energy is calculated using the following relation:

$$E_{rel}=E_t-\bar{E}_f \tag{50}$$

where $E_t$ is the total frame energy (in dB) calculated in Equation (6) and $\bar{E}_f$ is the long-term average frame energy, updated in each active frame using the following relation:

$$\bar{E}_f=0.99\bar{E}_f-0.01E_t.$$

The updating takes place only when SAD flag is set (variable SAD equal to 1).

The rules for unvoiced classification of WB signals are summarized below:

$$\begin{aligned}
&[((\bar{C}_{norm} < 0.695) \text{ AND } (\bar{e}_t < 4.0)) \text{ OR } (E_{rel} < -14)]\\
&\text{AND [last frame INACTIVE OR UNVOICED}\\
&\text{OR } ((e_{old} < 2.4) \text{ AND } (C_{norm}(d_0) + r_e < 0.66))]\\
&\text{AND } [dE0 < 250] \text{ AND } [e_t(1) < 2.7]\\
&\text{AND } \left[(\text{local } SAD \text{ flag} = 1) \text{ OR } \left(\bar{f}_{noise\_flat}^{[0]} < 1.45\right) \text{ OR } (\bar{N}_f < 20)\right]\\
&\text{AND NOT } [(\text{tonal\_stability AND}\\
&(((\bar{C}_{norm} > 0.52) \text{ AND } (\bar{e}_t > 0.5)) \text{ OR } (\bar{e}_t > 0.85))\\
&\text{AND } (E_{rel} > -14) \text{ AND } SAD \text{ flag set to } 1]
\end{aligned}$$

The first line of the condition is related to low-energy signals and signals with low correlation concentrating their energy in high frequencies. The second line covers voiced offsets, the third line covers explosive segments of a signal and the fourth line is for the voiced onsets. The fifth line ensures flat spectrum in case of noisy inactive frames. The last line discriminates music signals that would be otherwise declared as unvoiced.

For NB signals the unvoiced classification condition takes the following form:

$$[\text{local } SAD \text{ flag set to 0 OR } (E_{rel} < -25) \text{ OR}$$
$$((\overline{C}_{norm} < 0.61) \text{ AND } (\overline{e}_t < 7.0) \text{ AND (last frame INACTIVE OR}$$
$$\text{UNVOICED OR}((e_{old} < 7.0) \text{ AND } (C_{norm}(d_0) + r_e < 0.52))))]$$
$$\text{AND } [dE0 < 250] \text{ AND}[\overline{e}_t < 390] \text{ AND NOT}$$
$$[(\text{tonal\_stability AND } (((\overline{C}_{norm} > 0.52) \text{ AND } (\overline{e}_t > 0.5)) \text{ OR}(\overline{e}_t > 0.75))$$
$$\text{AND } (E_{rel} > -10) \text{ AND } SAD \text{ flag set to 1}]$$

Figure 6:
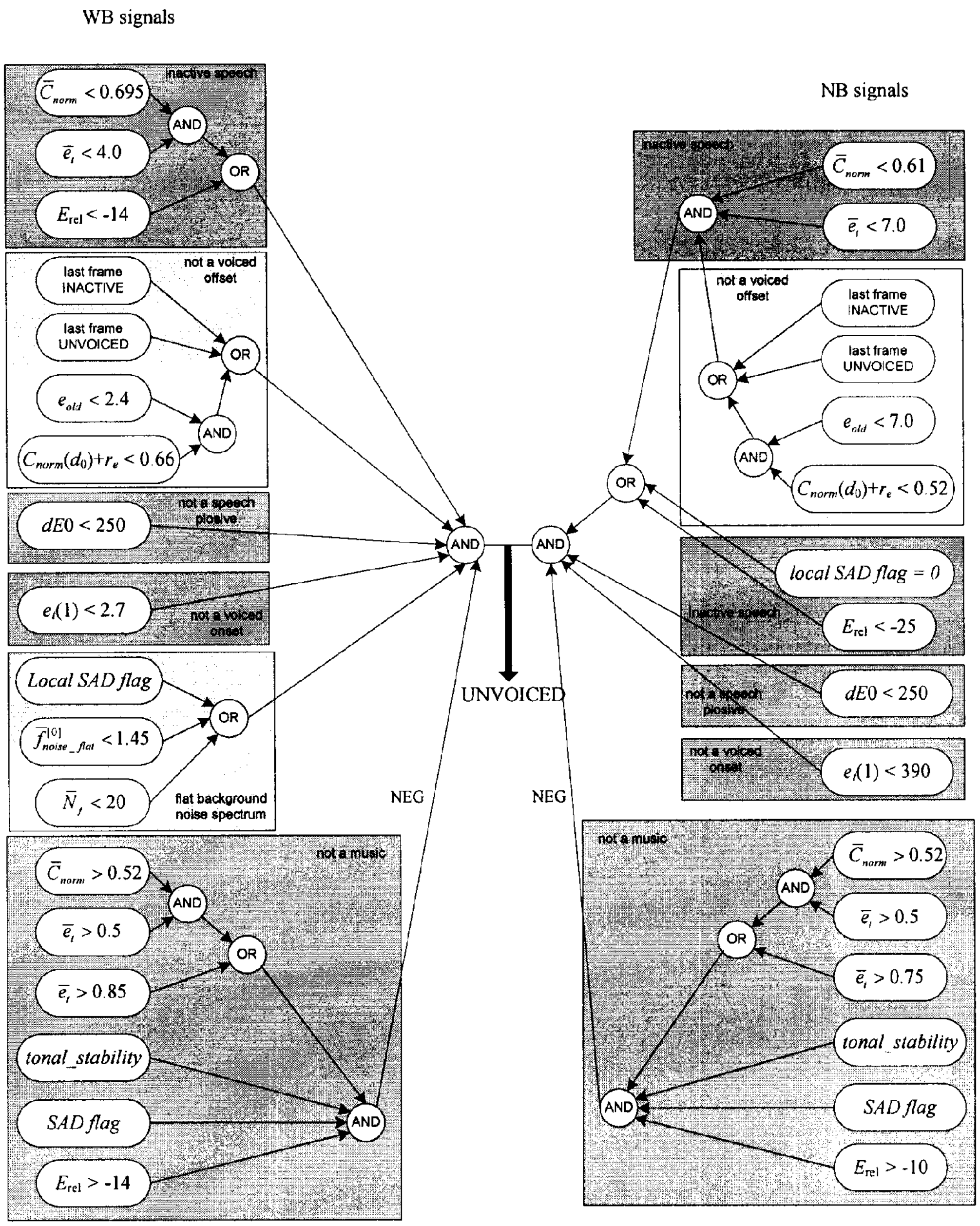
FIG. 6 is an example of decision tree for unvoiced speech discrimination.

The decision trees for the WB case and NB case are shown in FIG. 6. If the combined conditions are fulfilled the classification ends by selecting unvoiced coding mode.

Voiced Signal Classification

If a frame is not classified as inactive frame or as unvoiced frame then it is tested if it is a stable voiced frame. The decision rule is based on the normalized correlation in each subframe (with ¼ subsample resolution), the average spectral tilt and open-loop pitch estimates in all subframes (with ¼ subsample resolution).

The open-loop pitch estimation procedure is made by the LP analyzer and pitch tracker module 106 of FIG. 1. In Equation (19), three open-loop pitch estimates are used: $d_0$, $d_1$ and $d_2$, corresponding to the first half-frame, the second half-frame and the look ahead. In order to obtain precise pitch information in all four subframes, ¼ sample resolution fractional pitch refinement is calculated. This refinement is calculated on the weighted sound signal $s_{wd}(n)$. In this exemplary embodiment, the weighted signal $s_{wd}(n)$ is not decimated for open-loop pitch estimation refinement. At the beginning of each subframe a short correlation analysis (64 samples at 12.8 kHz sampling frequency) with resolution of 1 sample is done in the interval (−7,+7) using the following delays: $d_0$ for the first and second subframes and $d_1$ for the third and fourth subframes. The correlations are then interpolated around their maxima at the fractional positions $d_{max}-¾$, $d_{max}-½$, $d_{max}¼$, $d_{max}$, $d_{max}+¼$, $d_{max}+½$, $d_{max}+¾$. The value yielding the maximum correlation is chosen as the refined pitch lag.

Let the refined open-loop pitch lags in all four subframes be denoted as T(0), T(1), T(2) and T(3) and their corresponding normalized correlations as C(0), C(1), C(2) and C(3). Then, the voiced signal classification condition is given by:

$$[C(0)>0.605]\text{AND}$$
$$[C(1)>0.605]\text{AND}$$
$$[C(2)>0.605]\text{AND}$$
$$[C(3)>0.605]\text{AND}$$
$$[\overline{e}_t>4]\text{AND}$$
$$[|T(1)-T(0)|<3]\text{AND}$$
$$[|T(2)-T(1)|<3]\text{AND}$$
$$[|T(3)-T(2)|<3]$$

The condition says that the normalized correlation is sufficiently high in all subframes, the pitch estimates do not diverge throughout the frame and the energy is concentrated in low frequencies. If this condition is fulfilled the classification ends by selecting voiced signal coding mode, otherwise the signal is encoded by a generic signal coding mode. The condition applies to both WB and NB signals.

Estimation of Tonal Stability in the Super Wideband Content

In the encoding of super wideband signals, a specific coding mode is used for sound signals with tonal structure. The frequency range which is of interest is mostly 7000-14000 Hz but can also be different. The objective is to detect frames having strong tonal content in the range of interest so that the tonal-specific coding mode may be used efficiently. This is done using the tonal stability analysis described earlier in the present disclosure. However, there are some aberrations which are described in this section.

First, the spectral floor which is subtracted from the log-energy spectrum is calculated in the following way. The log-energy spectrum is filtered using a moving-average (MA) filter, or FIR filter, the length of which is $L_{MA}$=15 samples. The filtered spectrum is given by:

$$\text{sp\_floor}(j) = \frac{1}{2L_{MA}+1}\sum_{k=-L_{MA}}^{L_{MA}} E_{dB}(j+k),$$
$$\text{for } j = L_{MA}, \ldots , N_{SPEC} - L_{MA} - 1.$$

To save computational complexity, the filtering operation is done only for $j=L_{MA}$ and for the other lags, it is calculated as:

$$\text{sp\_floor}(j) = \text{sp\_floor}(j-1) + \frac{1}{2L_{MA}+1}\,[E_{dB}(j+L_{MA}) - E_{dB}(j-L_{MA}-1)],$$
$$\text{for } j = L_{MA}+1, \ldots , N_{SPEC} - L_{MA} - 1.$$

For the lags $0, \ldots , L_{MA}-1$ and $N_{SPEC}-L_{MA}, \ldots , N_{SPEC}-1$, the spectral floor is calculated by means of extrapolation. More specifically, the following relation is used:

$$sp\_\text{floor}(j)=0.9sp\_\text{floor}(j+1)+0.1E_{dB}(j),\ \text{for } j=L_{MA}-1, \ldots , 0,$$

$$sp\_\text{floor}(j)=0.9sp\_\text{floor}(j-1)+0.1E_{dB}(j),\ \text{for } j=N_{SPEC}-L_{MA}, \ldots , N_{SPEC}-1.$$

In the first equation above the updating proceeds from $L_{MA}-1$ downwards to 0.

The spectral floor is then subtracted from the log-energy spectrum in the same way as described earlier in the present disclosure.

The residual spectrum, denoted as $E_{res,dB}(j)$, is then smoothed over 3 samples as follows using a short-time moving-average filter:

$$E'_{res,dB}(j)=0.33[E_{res,dB}(j-1)+E_{res,dB}(j)+E_{res,dB}(j+1)],\ \text{for } j=1, \ldots , N_{SPEC}-1.$$

The search of spectral minima and their indexes, the calculation of correlation map and the long term correlation map are the same as in the method described earlier in the present disclosure, using the smoothed spectrum $E'_{res,dB}(j)$.

The decision about signal tonal stability in the super-wideband content is also the same as described earlier in the present disclosure, i.e. based on an adaptive threshold. However, in this case a different fixed threshold and step are used. The threshold thr_tonal is initialized to 130 and is updated in every frame as follows:

```
if (cor_map_sum > 130)
        thr_tonal = thr_tonal - 1.0
else
        thr_tonal = thr_tonal + 1.0
end.
```

The adaptive threshold thr_tonal is upper limited by 140 and lower limited by 120. The fixed threshold has been set with respect to the frequency range 7000-14000 Hz. For a different range, it will have to be adjusted. As a general rule of thumb, the following relationship may be applied thr_tonal=$N_{SPEC}$/2.

The last difference to the method described earlier in the present disclosure is that the detection of strong tones is not used in the super wideband content. This is motivated by the fact that strong tones are perceptually not suitable for the purpose of encoding the tonal signal in the super wideband content.

Although the present invention has been described in the foregoing disclosure by way of a non-restrictive, illustrative embodiment thereof, this embodiment can be modified at will, within the scope of the appended claims without departing from the spirit and nature of the subject invention.

What is claimed is:

1. A method for estimating a tonal stability of a sound signal using a frequency spectrum of the sound signal, the method comprising:

calculating a current residual spectrum of the sound signal by subtracting from the frequency spectrum of the sound signal a spectral floor defined by minima of the frequency spectrum;

detecting a plurality of peaks in the current residual spectrum as pieces of the current residual spectrum between pairs of successive minima of the current residual spectrum;

calculating a correlation map between each detected peak of the current residual spectrum and a shape in a previous residual spectrum corresponding to the position of the detected peak; and identifying the tonal stability of the sound signal based on calculating a long-term correlation map, wherein the long-term correlation map is calculated based on an update factor, the correlation map of a current frame, and an initial value of the long term correlation map.

2. A method as defined in claim 1, wherein calculating the current residual spectrum comprises:

searching for the minima in the frequency spectrum of the sound signal in the current frame;

estimating the spectral floor by connecting the minima of the frequency spectrum with each other; and subtracting the estimated spectral floor from the frequency spectrum of the sound signal in the current frame so as to produce the current residual spectrum.

3. A method as defined in claim 1, wherein detecting the peaks in the current residual spectrum comprises locating a maximum between each pair of two consecutive minima of the current residual spectrum.

4. A method as defined in claim 1, wherein calculating the correlation map comprises:

for each detected peak in the current residual spectrum, calculating a normalized correlation value with the previous residual spectrum, over frequency bins between two consecutive minima in the current residual spectrum that delimit the peak;

assigning a score to each detected peak, the score corresponding to the normalized correlation value; and for each detected peak, assigning the normalized correlation value of the peak over the frequency bins between the two consecutive minima that delimit the peak so as to form the correlation map.

5. A method as defined in claim 1, wherein calculating the long-teen correlation map comprises:

filtering the correlation map through a one-pole filter on a frequency bin by frequency bin basis; and summing the filtered correlation map over the frequency bins so as to produce a summed long-term correlation map.

6. A method as defined in claim 1, further comprising detecting strong tones in the sound signal.

7. A method as defined in claim 6, wherein detecting the strong tones in the sound signal comprises searching in the correlation map for frequency bins having a magnitude that exceeds a given fixed threshold.

8. A method as defined in claim 6, wherein detecting the strong tones in the sound signal comprises comparing the summed long-term correlation map with an adaptive threshold indicative of sound activity in the sound signal.

9. A method as defined in claim 1, further comprising verification of a presence of strong tones.

10. A method for detecting sound activity in a sound signal, wherein the sound signal is classified as one of an inactive sound signal and an active sound signal according to the detected sound activity in the sound signal, the method comprising:

estimating a parameter related to a tonal stability tonal stability of the sound signal used for distinguishing a music signal from a background noise signal;

wherein the tonal stability tonal stability estimation is performed according to claim 1.

11. A method as defined in claim 10, further comprising preventing update of noise energy estimates when a tonal sound signal is detected.

12. A method as defined in claim 10, wherein detecting the sound activity in the sound signal further comprises using a signal-to-noise ratio (SNR)-based sound activity detection.

13. A method as defined in claim 12, wherein using the signal-to-noise ratio (SNR)-based sound activity detection comprises detecting the sound signal based on a frequency dependent signal-to-noise ratio (SNR).

14. A method as defined in claim 12, wherein using the signal-to-noise ratio (SNR)-based sound activity detection comprises comparing an average signal-to-noise ratio ($SNR_{av}$) to a threshold calculated as a function of a long-term signal-to-noise ratio ($SNR_{LT}$).

15. A method as defined in claim 14, wherein using the signal-to-noise ratio (SNR)-based sound activity detection in the sound signal further comprises using noise energy estimates calculated in a previous frame in a SNR calculation.

16. A method as defined in claim 15, wherein using the signal-to-noise ratio (SNR)-based sound activity detection further comprises updating the noise estimates for a next frame.

17. A method as defined in claim 16, wherein updating the noise energy estimates for a next frame comprises calculating an update decision based on at least one of a pitch stability, a voicing, a non-stationarity parameter of the sound signal and a ratio between a second order and a sixteenth order of linear prediction residual error energies.

18. A method as defined in claim 14, comprising classifying the sound signal as one of an inactive sound signal and active sound signal, which comprises determining an inactive sound signal when the average signal-to-noise ratio ($SNR_{av}$) is inferior to the calculated threshold.

19. A method as defined in claim 14, comprising classifying the sound signal as one of an inactive sound signal and active sound signal, which comprises determining an active sound signal when the average signal-to-noise ratio ($SNR_{av}$) is larger than the calculated threshold.

20. A method as defined in claim 10, wherein estimating the parameter related to the tonal stability tonal stability of the sound signal prevents updating of noise energy estimates when a music signal is detected.

21. A method as defined in claim 10, further comprising calculating a complementary non-stationarity parameter and a noise character parameter in order to distinguish a music signal from a background noise signal and prevent update of noise energy estimates on the music signal.

22. A method as defined in claim 21, further comprising:

detecting a spectral attack;

calculating the complementary non-stationarity parameter based on an element selected from the group consisting of a current frame energy and an average frame energy.

23. A method as defined in claim 22, further comprising calculating a spectral diversity parameter.

24. A method as defined in claim 23, wherein calculating the spectral diversity parameter comprises:

calculating a ratio between an energy of the sound signal in a current frame and an energy of the sound signal in a previous frame, for frequency bands higher than a given number; and calculating the spectral diversity as a weighted sum of the computed ratio over all the frequency bands higher than the given number.

25. A method as defined in claim 22, wherein calculating the complementary non-stationarity parameter further comprises calculating an activity prediction parameter indicative of an activity of the sound signal.

26. A method as defined in claim 25, wherein calculating the activity prediction parameter comprises:

calculating a long-term value of a binary decision obtained from estimating the parameter related to the tonal stability tonal stability of the sound signal and the complementary non-stationarity parameter.

27. A method as defined in claim 25, wherein the update of the noise energy estimates is prevented in response to having simultaneously the activity prediction parameter larger than a first given fixed threshold and the complementary non-stationarity parameter larger than a second given fixed threshold.

28. A method as defined in claim 21, wherein calculating the noise character parameter comprises:

dividing a plurality of frequency bands into a first group of a certain number of first frequency bands and a second group of a rest of the frequency bands;

calculating a first energy value for the first group of frequency bands and a second energy value of the second group of frequency bands;

calculating a ratio between the first and second energy values so as to produce the noise character parameter; and calculating a long-term value of the noise character parameter based on the calculated noise character parameter.

29. A method as defined in claim 28, wherein the update of the noise energy estimates is prevented in response to having the noise character parameter inferior than a given fixed threshold.

30. A device for estimating a tonal stability tonal stability of a sound signal using a frequency spectrum of the sound signal, the device comprising:

means for calculating a current residual spectrum of the sound signal by subtracting from the frequency spectrum of the sound signal a spectral floor defined by minima of the frequency spectrum;

means for detecting a plurality of peaks in the current residual spectrum as pieces of the current residual spectrum between pairs of successive minima of the current residual spectrum;

means for calculating a correlation map between each detected peak of the current residual spectrum and a shape in a previous residual spectrum corresponding to the position of the detected peak; and means for identifying the tonal stability of the sound signal based on calculating a long-term correlation map, wherein the long-term correlation map is calculated based on an update factor, the correlation map of a current frame, and an initial value of the long-term correlation map.

31. A device for estimating a tonal stability tonal stability of a sound signal using a frequency spectrum of the sound signal, the device comprising:

a calculator of a current residual spectrum of the sound signal by subtracting from the frequency spectrum of the sound signal a spectral floor defined by minima of the frequency spectrum;

a detector of a plurality of peaks in the current residual spectrum as pieces of the current residual spectrum between pairs of successive minima of the current residual spectrum;

a calculator of a correlation map between each detected peak of the current residual spectrum and a shape in a previous residual spectrum corresponding to the position of the detected peak; and a calculator identifying the tonal stability of the sound signal based on calculating a long-term correlation map, wherein the long-term correlation map is calculated based on an update factor, the correlation map of a current frame, and an initial value of the long-term correlation map.

32. A device as defined in claim 31, wherein the calculator of the current residual spectrum comprises:

a locator of the minima in the frequency spectrum of the sound signal in the current frame;

an estimator of the spectral floor which connects the minima of the frequency spectrum with each other; and a subtractor of the estimated spectral floor from the frequency spectrum so as to produce the current residual spectrum.

33. A device as defined in claim 31, wherein the calculator of the long-term correlation map comprises:

a filter for filtering the correlation map on a frequency bin by frequency bin basis; and an adder for summing the filtered correlation map over the frequency bins so as to produce a summed long-term correlation map.

34. A device as defined in claim 31, further comprising a detector of strong tones in the sound signal.

35. A device for detecting sound activity in a sound signal, wherein the sound signal is classified as one of an inactive sound signal and an active sound signal according to the detected sound activity in the sound signal, the device comprising:

means for estimating a parameter related to a tonal stability tonal stability of the sound signal used for distinguishing a music signal from a background noise signal;

wherein the tonal stability tonal stability parameter estimation means comprises a device according to claim 30.

36. A device for detecting sound activity in a sound signal, wherein the sound signal is classified as one of an inactive sound signal and an active sound signal according to the detected sound activity in the sound signal, the device comprising:

a tonal stability tonal stability estimator of the sound signal, used for distinguishing a music signal from a background noise signal;

wherein the tonal stability tonal stability estimator comprises a device according to claim 31.

37. A device as defined in claim 36, further comprising a signal-to-noise ratio (SNR)-based sound activity detector.

38. A device as defined in claim 37, wherein the (SNR)-based sound activity detector comprises a comparator of an average signal to noise ratio ($SNR_{av}$) with a threshold which is a function of a long-term signal to noise ratio ($SNR_{LT}$).

39. A device as defined in claim 37, further comprising a noise estimator for updating noise energy estimates in a calculation of a signal-to-noise ratio (SNR) in the SNR-based sound activity detector.

40. A device as defined in claim 36, further comprising a calculator of a complementary non-stationarity parameter and a calculator of a noise character of the sound signal for distinguishing a music signal from a background noise signal and preventing update of noise energy estimates.

41. A device as defined in claim 36, further comprising a calculator of a spectral parameter used for detecting spectral changes and spectral attacks in the sound signal.

* * * * *